(12) United States Patent
Morikuni

(10) Patent No.: US 11,086,112 B2
(45) Date of Patent: Aug. 10, 2021

(54) PROJECTION SYSTEM AND PROJECTION-TYPE IMAGE DISPLAY APPARATUS

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/524,510

(22) Filed: Jul. 29, 2019

(65) Prior Publication Data

US 2020/0033574 A1 Jan. 30, 2020

(30) Foreign Application Priority Data

Jul. 30, 2018 (JP) .............................. JP2018-142213

(51) Int. Cl.
*G02B 17/08* (2006.01)
*G03B 21/28* (2006.01)

(52) U.S. Cl.
CPC ..... *G02B 17/0896* (2013.01); *G02B 17/0856* (2013.01); *G03B 21/28* (2013.01)

(58) Field of Classification Search
CPC . G02B 17/0896; G02B 17/0856; G03B 21/28
USPC .......................................................... 353/76
See application file for complete search history.

(56) References Cited

U.S. PATENT DOCUMENTS

| 8,014,075 B2 | 9/2011 | Minefuji |
| 10,451,962 B2 | 10/2019 | Amano |
| 2004/0156117 A1 | 8/2004 | Takaura et al. |
| 2006/0126032 A1 | 6/2006 | Takaura et al. |
| 2006/0193036 A1 | 8/2006 | Suzuki |
| 2007/0184368 A1 | 8/2007 | Nishikawa et al. |

(Continued)

FOREIGN PATENT DOCUMENTS

| CN | 101430484 A | 5/2009 |
| EP | 1494057 A2 | 1/2005 |

(Continued)

OTHER PUBLICATIONS

Translation of WO 2019151252 A1 (Year: 2020).*

(Continued)

*Primary Examiner* — Jerry L Brooks

(74) *Attorney, Agent, or Firm* — Oliff PLC

(57) ABSTRACT

A projection system is formed of a first optical system and a second optical system sequentially arranged from the demagnifying side toward the magnifying side and forms a first intermediate image and a second intermediate image in positions between a demagnifying-side image formation plane and a magnifying-side image formation plane of the projection system. The second optical system is a lens. The lens has a first transmissive surface, a reflective surface, and a second transmissive surface. The reflective surface has a concave shape, and the second transmissive surface has a convex shape protruding toward the magnifying side. An imaginary line specified in the lens inclines with respect to an imaginary vertical line perpendicular to the imaginary axis in a plane YZ, and the intermediate image is located between the first transmissive surface and the reflective surface.

19 Claims, 26 Drawing Sheets

(56) References Cited

U.S. PATENT DOCUMENTS

| | | |
|---|---|---|
| 2008/0304019 A1 | 12/2008 | Takaura et al. |
| 2009/0015801 A1 | 1/2009 | Takaura et al. |
| 2009/0015910 A1 | 1/2009 | Takaura et al. |
| 2009/0021703 A1 | 1/2009 | Takaura et al. |
| 2009/0116124 A1 | 5/2009 | Minefuji |
| 2009/0231690 A1 | 9/2009 | Nishikawa et al. |
| 2010/0039625 A1 | 2/2010 | Takaura et al. |
| 2010/0053737 A1* | 3/2010 | Fujita ............. G02B 17/0852 359/364 |
| 2010/0128345 A1 | 5/2010 | Suzuki |
| 2010/0165308 A1* | 7/2010 | Morikuni ............. G03B 21/28 353/98 |
| 2010/0310724 A1 | 12/2010 | Nakata et al. |
| 2011/0038039 A1 | 2/2011 | Takaura et al. |
| 2014/0204351 A1 | 7/2014 | Matsuo |
| 2015/0323767 A1 | 11/2015 | Morikuni et al. |
| 2016/0112685 A1 | 4/2016 | Matsuo |
| 2016/0246037 A1 | 8/2016 | Amano |
| 2017/0059971 A1 | 3/2017 | Takano et al. |
| 2018/0059519 A1* | 3/2018 | Nagatoshi ............. G02B 15/16 |
| 2018/0307041 A1 | 10/2018 | Masui et al. |
| 2019/0011684 A1 | 1/2019 | Ishihara et al. |
| 2020/0142291 A1* | 5/2020 | Nishikawa ............. G02B 13/16 |

FOREIGN PATENT DOCUMENTS

| | | | |
|---|---|---|---|
| EP | 2730961 A1 | 5/2014 | |
| JP | H09-258105 A | 10/1997 | |
| JP | 2004-246042 A | 9/2004 | |
| JP | 2004-258620 A | 9/2004 | |
| JP | 2004-361777 A | 12/2004 | |
| JP | 2006-235516 A | 9/2006 | |
| JP | 2007-079524 A | 3/2007 | |
| JP | 2010-020344 A | 1/2010 | |
| JP | 4396769 B2 | 1/2010 | |
| JP | 5145486 B1 | 2/2013 | |
| JP | 2017-156712 A | 9/2017 | |
| JP | 2017-156713 A | 9/2017 | |
| JP | 2017-156714 A | 9/2017 | |
| JP | 2019-133061 A | 8/2019 | |
| JP | WO 2019151252 A1 * | 8/2019 | ............. G02B 17/08 |
| WO | 2013/005444 A1 | 1/2013 | |
| WO | 2018/066714 A1 | 4/2018 | |

OTHER PUBLICATIONS

Jan. 8, 2020 Extended Search Report issued in European Patent Application No. 19188585.4.

Jan. 22, 2020 Extended European Search Report issued in European Patent Application No. 19188317.2.

Jun. 29, 2020 Office Action Issued in U.S. Appl. No. 16/522,846.

Oct. 14, 2020 Notice of Allowance issued in U.S. Appl. No. 16/522,846.

Dec. 12, 2019 European Search Report issued in European Patent Application No. 19188314.9.

Dec. 1, 2020 Office Action issued in U.S. Appl. No. 16/522,846.

Mar. 4, 2021 Notice of Allowance issued in U.S. Appl. No. 16/522,846.

* cited by examiner

PROJECTION SYSTEM AND PROJECTION-TYPE IMAGE DISPLAY APPARATUS

The present application is based on, and claims priority from JP Application Serial Number 2018-142213, filed Jul. 30, 2018, the disclosure of which is hereby incorporated by reference herein in its entirety.

BACKGROUND

1. Technical Field

The present disclosure relates to a projection system having a concave reflective surface on the magnifying side of an intermediate image, and to a projection-type image display apparatus including the projection system.

2. Related Art

WO 2013/005444 describes a projection-type image display apparatus that enlarges a projection image formed by an image formation section and projects the enlarged projection image via a projection system. The projection system described in WO 2013/005444 is formed of a first optical system and a second optical system sequentially arranged from the demagnifying side toward the magnifying side. The first optical system includes a refractive optical system. The second optical system is formed of a reflection mirror having a concave reflective surface. The image formation section includes a light source and a light valve. The image formation section forms a projection image in the demagnifying-side image formation plane of the projection system. The projection system forms two intermediate images and projects a final image on a screen disposed in the magnifying-side image formation plane of the projection system. A first intermediate image located at the demagnifying side is located in the first optical system. A second intermediate image located at the magnifying side is located in a position between the first optical system and the reflective surface.

WO 2013/005444 is an embodiment of the related art.

In the projection system described in WO 2013/005444, shorting the projection distance causes the second intermediate image close to the reflective surface to incline toward the direction along the optical axis of the first optical system. The size of the second intermediate image increases as the second intermediate image inclines. When the size of the second intermediate image increases, it is necessary to increase the size of the reflective surface located at the magnifying side of the second intermediate image. Therefore, in a projection system having only a concave reflective surface on the magnifying side of the second intermediate image, shorting the projection distance causes an increase in the size of the reflective surface.

SUMMARY

An advantage of some aspects of the present disclosure is to provide a projection system capable of suppressing an increase in size of a concave reflective surface disposed on the magnifying side of a second intermediate image even in the case of a short projection distance. Another advantage of some aspects of the present disclosure is to provide a projection-type image display apparatus including the projection system.

An aspect of the present disclosure is directed to a projection system including a first optical system and a second optical system sequentially arranged from a demagnifying side toward a magnifying side, the projection system forming a first intermediate image and a second intermediate image in positions between a demagnifying-side image formation plane and a magnifying-side image formation plane of the projection system. The second optical system is a lens. The lens has a first transmissive surface, a reflective surface, and a second transmissive surface sequentially arranged from the demagnifying side toward the magnifying side. Three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z. The first transmissive surface and the reflective surface are located at the lower side of an imaginary axis extending in the axis-Z direction. The second transmissive surface is located at the upper side of the imaginary axis. The reflective surface has a concave shape. The second transmissive surface has a convex shape protruding toward the magnifying side. An imaginary line that connects an upper intersection to a lower intersection inclines with respect to an imaginary vertical line perpendicular to the imaginary axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ. The first intermediate image is located in the first optical system. The second intermediate image is located in the lens between the first transmissive surface and the reflective surface.

In the aspect of the present disclosure, the first optical system may be a refractive optical system.

In the aspect of the present disclosure, the imaginary axis may coincide with an optical axis of the first optical system.

In the aspect of the present disclosure, principal rays between the first optical system and the second optical system may approach each other toward the second optical system.

In the aspect of the present disclosure, any of the first transmissive surface, the reflective surface, and the second transmissive surface may be an aspheric surface.

In the aspect of the present disclosure, the first transmissive surface may be an aspheric surface.

In the aspect of the present disclosure, the intermediate image may have a shape so distorted as to correct trapezoidal distortion of a final image formed in the magnifying-side image formation plane.

In the aspect of the present disclosure, the first transmissive surface, the reflective surface, and the second transmissive surface may form a coaxial optical system having surfaces rotationally symmetric with respect to the imaginary axis, and the imaginary axis may be a design reference axis.

In the aspect of the present disclosure, the projection system may satisfy a conditional expression below, $$0° < \theta < 90° + \gamma \quad (1)$$

where θ is an inclination angle over which a side of the imaginary line that is a side facing the upper intersection rotates counterclockwise relative to the imaginary vertical line around an intersection of the imaginary vertical line and the imaginary line, and γ is an angle from the imaginary axis to the lower peripheral light ray, which is a light ray of the lower-end light flux and intersects the imaginary axis.

In the aspect of the present disclosure, it is desirable that the projection system satisfies a conditional expression (2) below.

$$90°<\theta \tag{2}$$

A projection-type image display apparatus according to another aspect of the present disclosure includes any of the projection systems described above and an image formation section that displays a projection image in the demagnifying-side image formation plane of the projection system.

In the aspect of the present disclosure, the image formation section may form the projection image on one side of an optical axis of the first optical system, the first intermediate image may be located at a side opposite the projection image with respect to the optical axis, and the second intermediate image may be located at the lower side of the imaginary axis.

DESCRIPTION OF EXEMPLARY EMBODIMENTS

A projection system according to an embodiment of the present disclosure and a projection-type image display apparatus including the projection system will be described below in detail with reference to the drawings.

Projection-Type Image Display Apparatus

Figure 1:
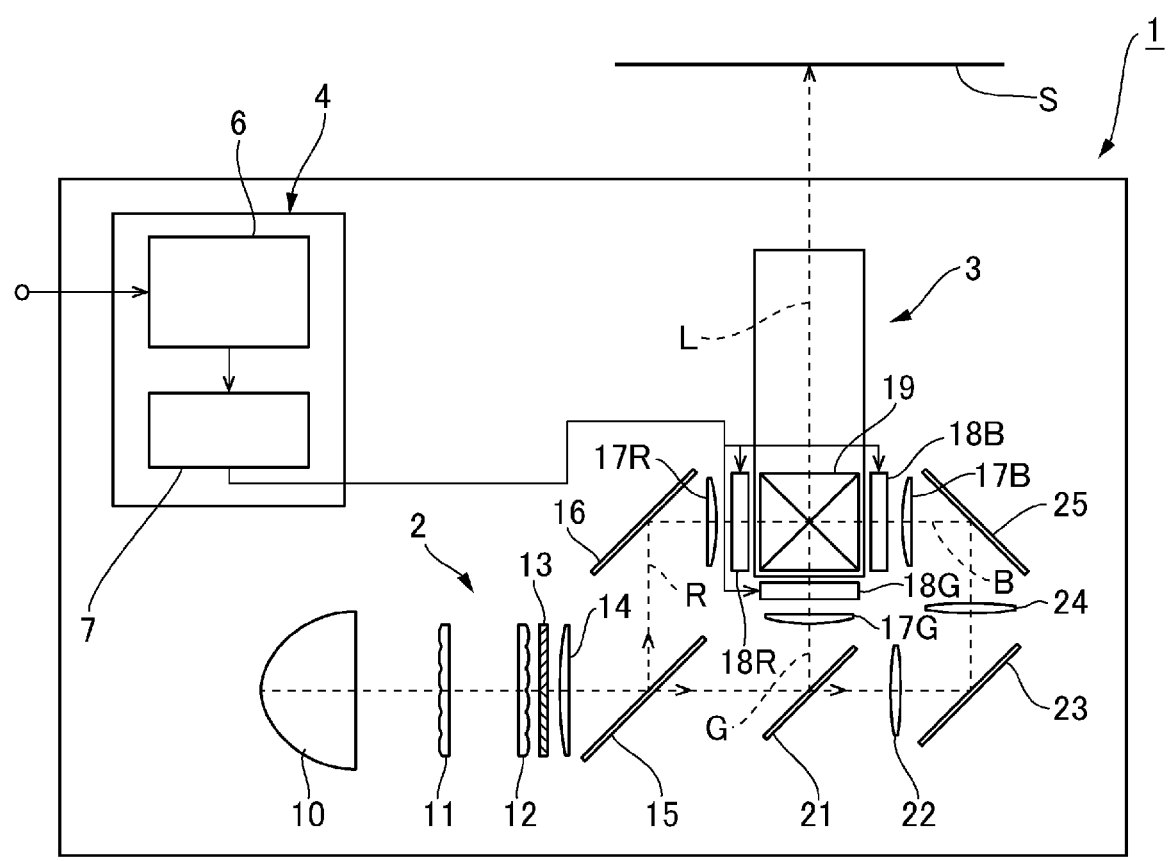
FIG. 1 is a schematic configuration diagram of a projection-type image display apparatus including a projection system according to an embodiment of the present disclosure.

FIG. 1 is a schematic configuration diagram of the projection-type image display apparatus including the projection system according to the embodiment of the present disclosure. A projection-type image display apparatus 1 includes an image formation section 2, which generates an image light to be projected on a screen S, a projection system 3, which enlarges and projects the image light, and a controller 4, which controls the action of the image formation section 2, as shown in FIG. 1.

Image Light Generation System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp, a solid-state light source, or any other light source. The first optical integration lens 11 and the second optical integration lens 12 each include a plurality of lens elements arranged in an array. The first optical integration lens 11 divides a light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light from the second optical integration lens 12 into predetermined linearly polarized light. The superimposing lens 14 superimposes images of each of the lens elements of the first optical integration lens 11 on one another on a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is an image display device. The liquid crystal panel 18R modulates the R light in accordance with an image signal to form a red projection image. One of the liquid crystal panels 18R, 18G, and 18B is also called a display.

The image formation section 2 further includes a second dichroic mirror 21, a field lens 17G, and the liquid crystal panel 18G. The second dichroic mirror 21 reflects the G light, which is part of the light rays from the first dichroic mirror 15, and transmits B light, which is part of the light rays from the first dichroic mirror 15. The G light reflected off the second dichroic mirror 21 passes through the field lens 17G and is incident on the liquid crystal panel 18G. The liquid crystal panel 18G is an image display device. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image display device. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, combines the light modulated by the liquid crystal panel 18R, the light modulated by the liquid crystal panel 18G, and the light modulated by the liquid crystal panel 18B with one another into image light.

The cross dichroic prism 19 forms part of the projection system 3. The projection system 3 enlarges and projects the combined image light from the cross dichroic prism 19 (projection images formed by liquid crystal panels 18R, 18G, and 18B) on the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors on a color basis. The display driver 7 operates the liquid crystal panels 18R, 18G, and 18B based on the color projection image signals outputted from the image processor 6. The image processor 6 thus displays projection images corresponding to the image signals on the liquid crystal panels 18R, 18G, and 18B.

Projection System

The projection system 3 will next be described. In the following sections, Embodiments 1 and 2 will be described as embodiments of the projection system 3 incorporated in the projection-type image display apparatus 1.

Embodiment 1

Figure 2:
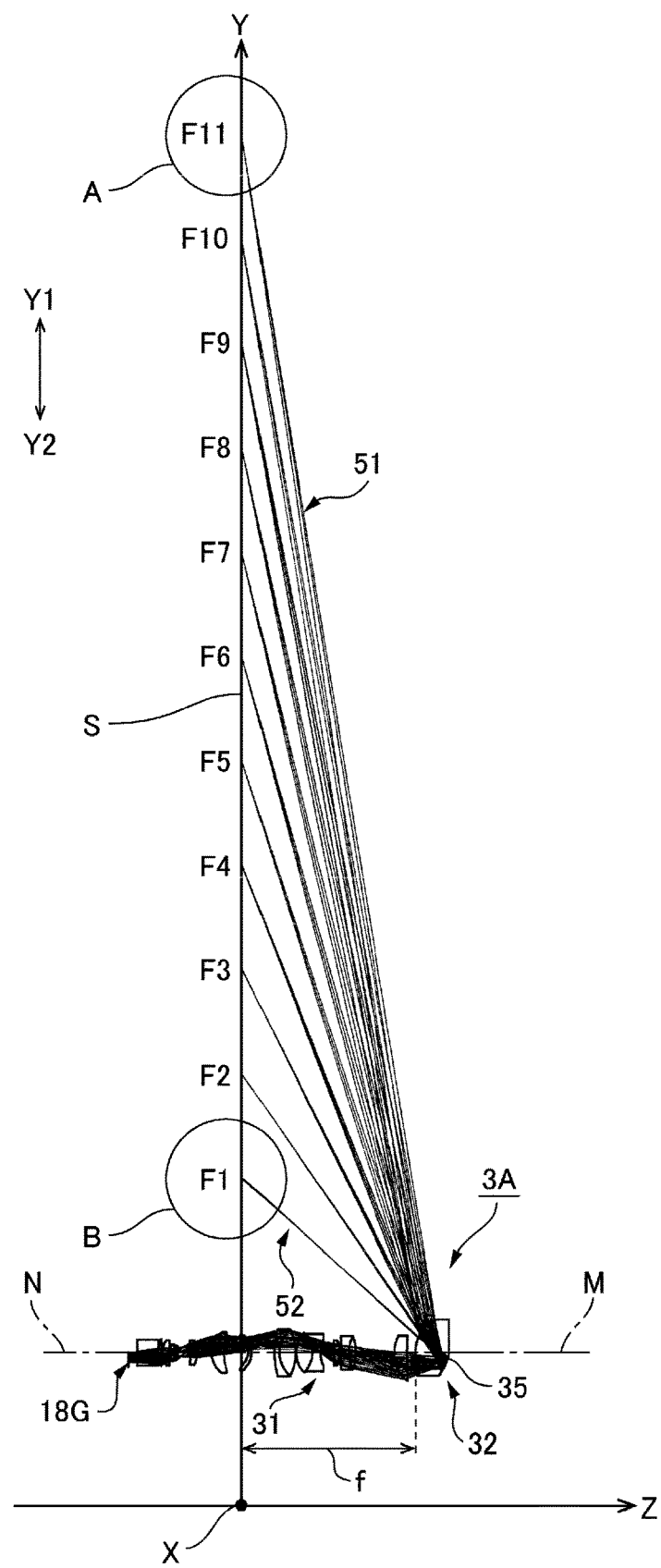
FIG. 2 is a light ray diagram of a projection system according to Embodiment 1.
Figure 3:
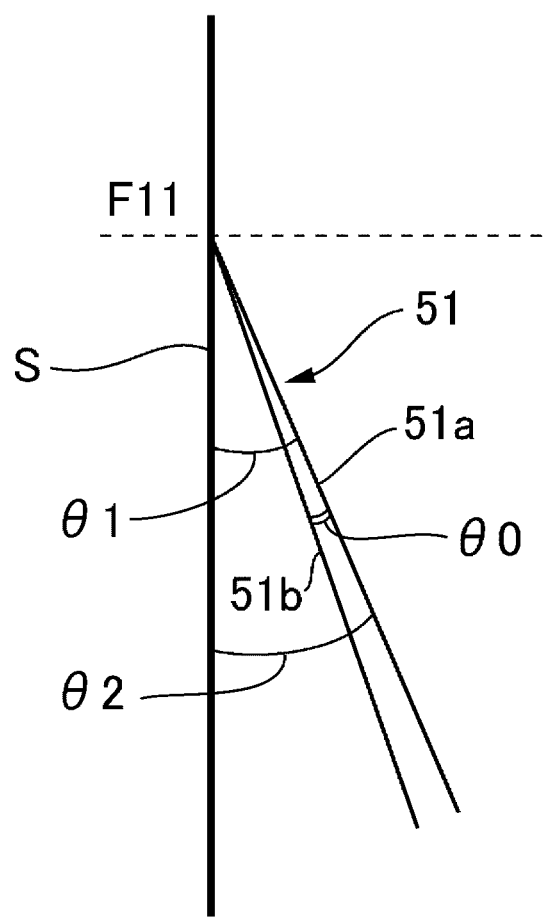
FIG. 3 is a partially enlarged view of a portion A in FIG. 2.
Figure 4:
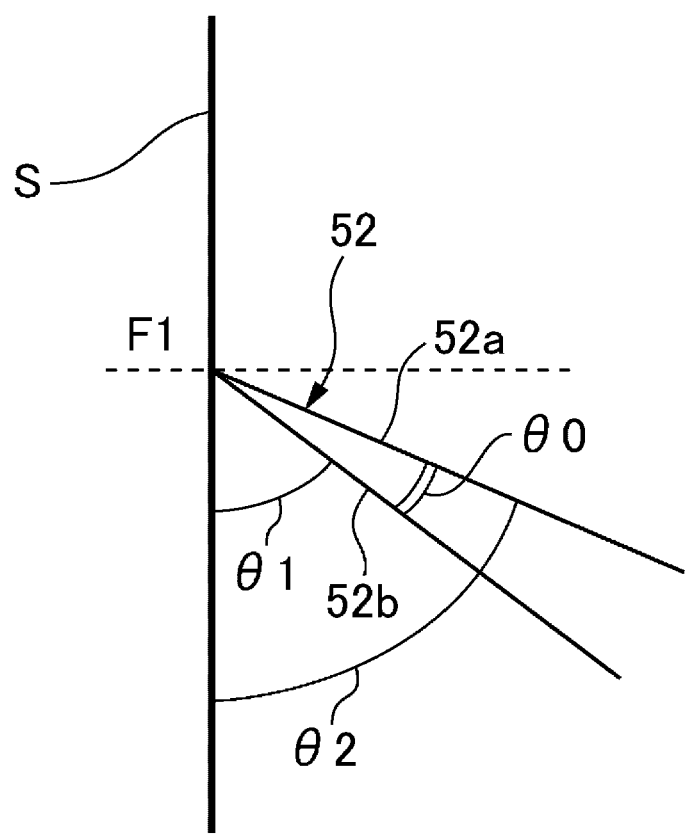
FIG. 4 is a partially enlarged view of a portion B in FIG. 2.
Figure 5:
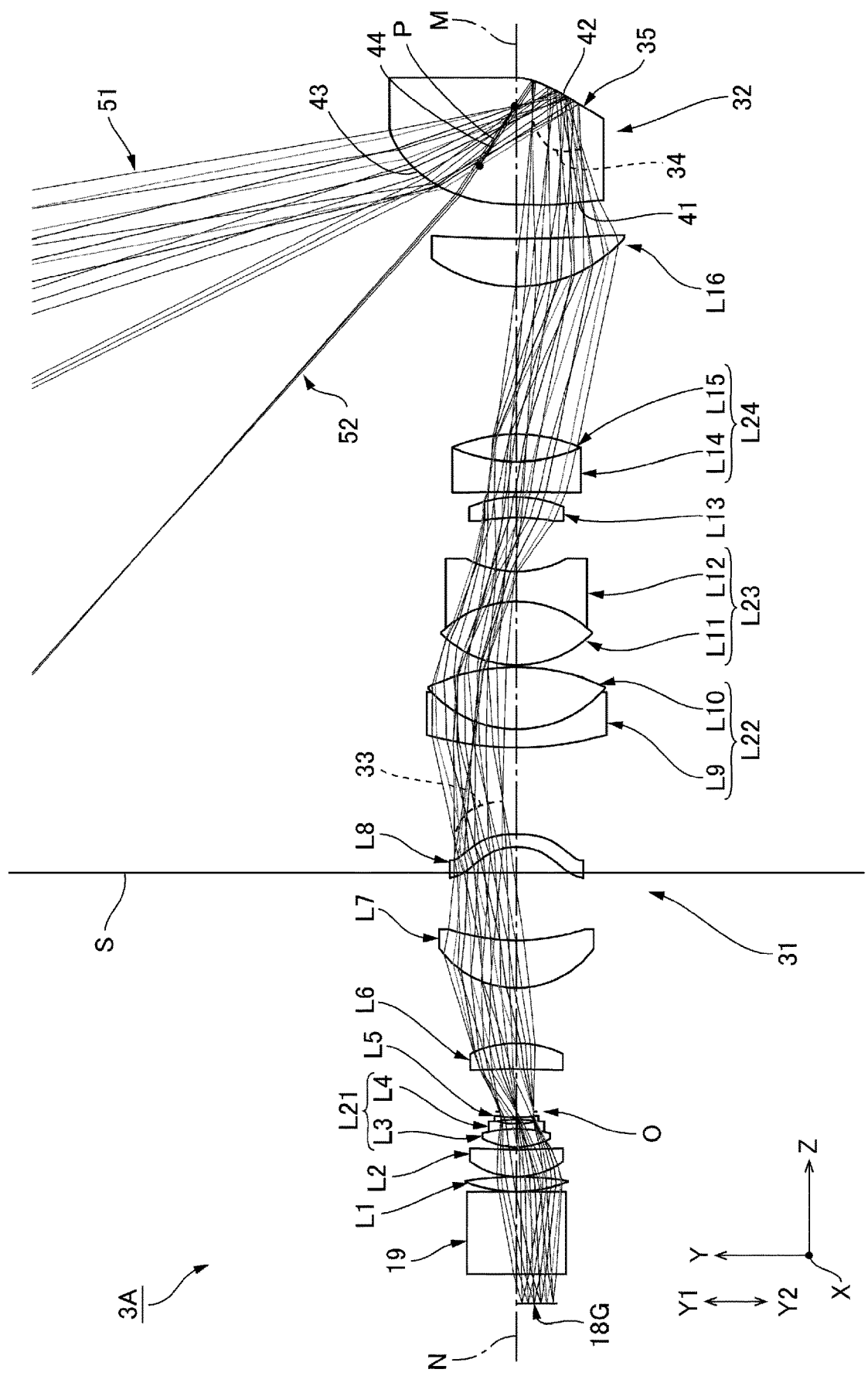
FIG. 5 is a light ray diagram of the projection system according to Embodiment 1 enlarged.
Figure 6:
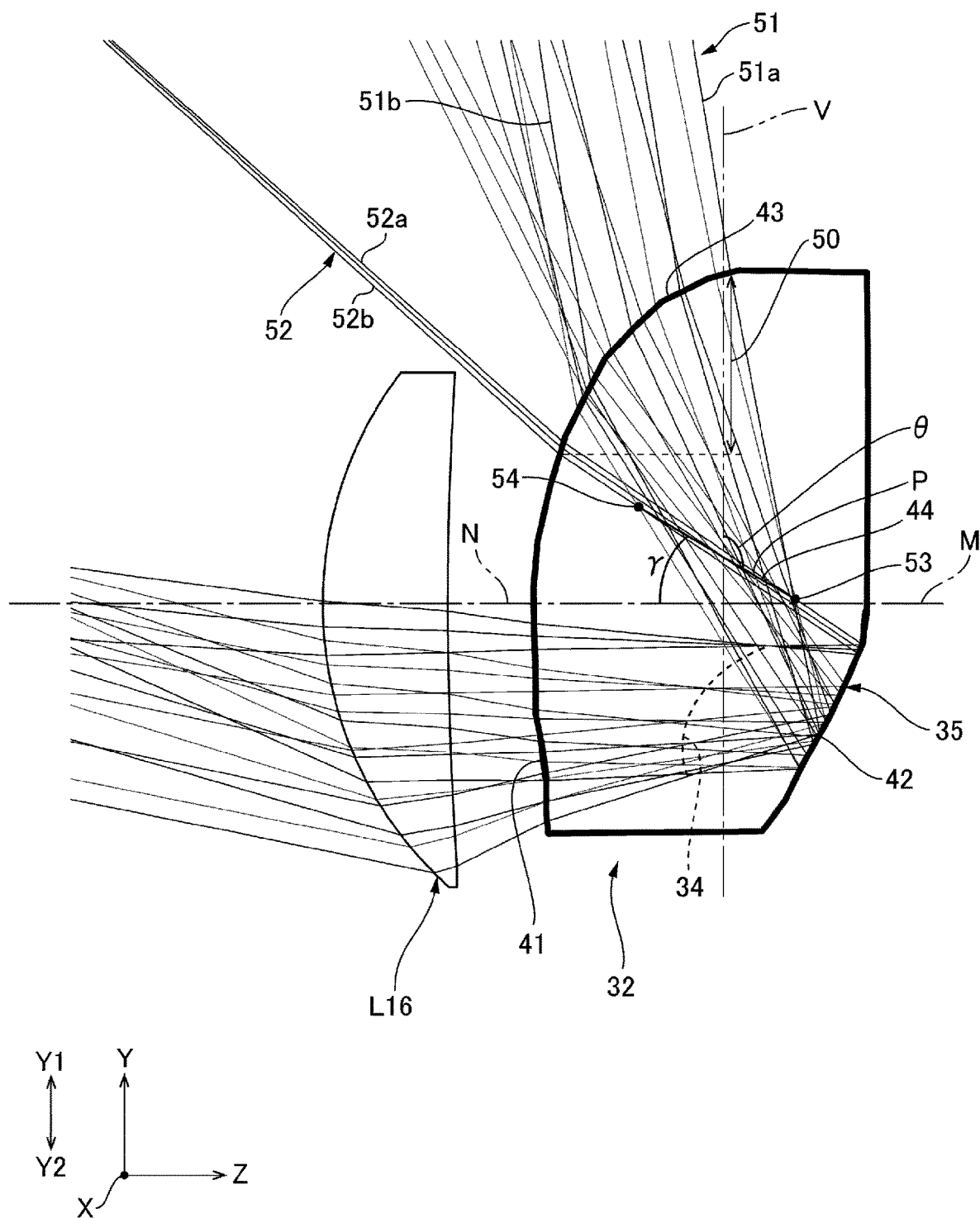
FIG. 6 is a light ray diagram with a portion including a second optical system of the projection system according to Embodiment 1 enlarged.

FIG. 2 is a light ray diagram of a projection system according to Embodiment 1 of the present disclosure. FIG. 3 is a partially enlarged view of a portion A in FIG. 2. FIG. 4 is a partially enlarged view of a portion B in FIG. 2. FIG. 5 is a light ray diagram of the projection system according to Embodiment 1 enlarged. FIG. 6 is a light ray diagram with a portion including a second optical system of the projection system according to Embodiment 1 enlarged. FIG. 2 diagrammatically shows 11 light fluxes F1 to F11, which exit out of a projection system 3A and reach the screen S. The light flux F1 is a light flux that reaches a lowest image height position. The light flux F11 is a light flux that reaches a highest image height position. The light fluxes F2 to F10 are light fluxes that reach image height positions between the image height position that the light flux F1 reaches and the image height position that the light flux F11 reaches.

The projection system 3A according to the present embodiment is formed of a first optical system 31 and a second optical system 32 sequentially arranged from the demagnifying side toward the magnifying side, as shown in FIG. 2. The projection system 3A forms a first intermediate image 33 and a second intermediate image 34 in positions between the demagnifying-side image formation plane and the magnifying-side image formation plane of the projection system 3A, as shown in FIG. 5.

The first optical system 31 is a refractive optical system including a plurality of lenses. In the present embodiment, the first optical system 31 includes 16 lenses. The second optical system 32 is formed of a lens 35. The liquid crystal panels 18R, 18G, and 18B of the image formation section 2 are disposed in the demagnifying-side image formation plane. FIGS. 2 and 5 show the liquid crystal panel 18G, which is one of the three liquid crystal panels 18R, 18G, and 18B.

The first intermediate image 33 is located at the demagnifying side of the second intermediate image 34. The first intermediate image 33 is formed in the first optical system 31. The second intermediate image 34 is formed in the second optical system 32, that is, the lens 35.

The liquid crystal panels 18R, 18G, and 18B form projection images on one side of an optical axis N of the first optical system 31 in the demagnifying-side image formation. The first intermediate image 33 is located at the other side of the optical axis N of the first optical system 31. The second intermediate image 34 is located at the one side of the optical axis N of the first optical system 31. That is, the projection images and the second intermediate image 34 are located at the one side of the optical axis N, and the first intermediate image 33 is located at the side opposite the projection images and the second intermediate image 34 with respect to the optical axis N.

The screen S is disposed in the magnifying-side image formation plane. A final image projected on the screen S has an oblong shape elongated in the lateral direction. In the present embodiment, the final image has an aspect ratio of 16:10.

The first optical system 31 includes the cross dichroic prism 19 and 16 lenses L1 to L16, as shown in FIG. 5. The first lens L1 to the sixteenth lens L16 are arranged in the presented order from the demagnifying side toward the magnifying side. In the present embodiment, the third lens L3 and the fourth lens L4 are bonded to each other to form a first doublet L21. The ninth lens L9 and the tenth lens L10 are bonded to each other to form a second doublet L22. The eleventh lens L11 and the twelfth lens L12 are bonded to each other to form a third doublet L23. The fourteenth lens L14 and the fifteenth lens L15 are bonded to each other to form a fourth doublet L24. A stop O is disposed between the fifth lens L5 and the sixth lens L6. In the present embodiment, the fifth lens L5 and the eighth lens L8 are two lenses that are each an aspheric lens having aspheric surfaces on both surfaces.

In the first optical system 31, the sixteenth lens L16, which is located in a position closest to the magnifying side, has positive power. Since the sixteenth lens L16, which is located in a position closest to the magnifying side, has positive power in the first optical system 31, the principal rays between the first optical system 31 and the second optical system 32 approach each other toward the second optical system 32, as shown in FIG. 5.

The lens 35, which forms the second optical system 32, is made of resin. The lens 35 has a first transmissive surface 41, a reflective surface 42, and a second transmissive surface 43 sequentially arranged from the demagnifying side toward the magnifying side, as shown in FIG. 6. In the case where the lens 35 is made of resin, the lens 35 can be manufactured in injection molding. A lens 35 having a complicated shape is therefore readily manufactured.

In the following description, three axes perpendicular to one another are called axes X, Y, and Z for convenience. A first direction in which the first transmissive surface 41 and the reflective surface 42 are arranged is called an axis-Z direction. A second direction, which is called an axis-y direction, coincides with the vertical direction of the screen S. One side of the axis Y is called an upper side Y1, and the other side of the axis Y is called a lower side Y2. A first plane perpendicular to the axis X and containing the axes Y and Z is called a plane YZ. FIGS. 1 to 6 therefore each show the plane YZ. The optical axis N of the first optical system 31 extends in the axis-Z direction. The image formation section 2 forms a projection image on the upper side Y1 of the optical axis N of the first optical system 31. The second intermediate image 34 is formed on the lower side Y2 of the optical axis N of the first optical system 31. The lateral direction of the screen S coincides with a third direction, which is called the axis-X direction. In the following description, an imaginary axis M extending in the axis-Z direction is set in the plane YZ. The imaginary axis M is a reference axis used in the design of the lens 35. The imaginary axis M is perpendicular to the screen S, which is the magnifying-side image formation plane. The imaginary axis M is substantially perpendicular to the screen S in some cases.

The first transmissive surface 41 and the reflective surface 42 are located at the lower side Y2 of the imaginary axis M. The second transmissive surface 43 is located at the upper side Y1 of the imaginary axis M. The reflective surface 42 has a concave shape. The reflective surface 42 therefore has positive power. The reflective surface 42 is provided by externally forming a reflective coating on the lens 35. The second transmissive surface 43 has a convex shape protruding toward the magnifying side. The second transmissive surface 43 therefore has positive power. The first transmissive surface 41, the reflective surface 42, and the second transmissive surface 43 form a coaxial optical system having surfaces rotationally symmetric with respect to the imaginary axis M. Therefore, the imaginary axis M is the reference axis used in the design of the lens 35 and is the optical axis of the lens 35. In the present embodiment, the imaginary axis M coincides with the optical axis N of the first optical system 31. The imaginary axis M does not necessarily coincide with the optical axis N of the first optical system 31.

The upper and lower halves of the lens 35 are each configured to be rotationally symmetric with respect to the imaginary axis M. That is, the first transmissive surface 41, the reflective surface 42, and the second transmissive surface 43 are so shaped that the cross-sectional shape in the plane YZ shown in FIG. 2 is rotated around the imaginary axis M over an angular range of 90° toward one side and the other side of the axis-X direction. In the present embodiment, the first transmissive surface 41 and the reflective surface 42 are each an aspheric surface.

An imaginary line P can be specified in the lens 35 of the second optical system 32, as shown in FIG. 6. The imaginary line P connects an upper intersection 53 to a lower intersection 54, the upper intersection 53 being an intersection where an upper peripheral light ray 51a of an upper-end light flux 51, where the upper-end light flux 51 is the light flux passing through the axis-Y-direction upper end of an effective range 50 of the second transmissive surface 43, and an upper peripheral light ray 52a of a lower-end light flux 52, where the lower-end light flux 52 is the light flux passing through the axis-Y-direction lower end of the effective range 50, intersect with each other in the plane YZ, and the lower intersection 54 being an intersection where a lower peripheral light ray 51b of the upper-end light flux 51 and a lower peripheral light ray 52b of the lower-end light flux 52 intersect with each other in the plane YZ. The imaginary line P inclines by 120.284° with respect to an imaginary vertical line V, which is perpendicular to the imaginary axis M in the plane YZ. In the present embodiment, the imaginary line P is located in the lens 35. Further, the imaginary line P is located at the upper side of the imaginary axis M.

The second intermediate image 34 is an inverted final image turned upside down. The second intermediate image 34 is an image so distorted that an oblong final image is projected on the screen S, which is the magnifying-side image formation plane. More specifically, the second intermediate image 34 has a shape so distorted as to correct trapezoidal distortion of the final image formed on the screen S. That is, the second intermediate image 34 has distortion opposite the trapezoidal distortion of the final image. The second intermediate image 34 is therefore so formed that the shortest edge thereof is the edge having the highest image height on the screen S.

Lens Data

Data on the lenses of the projection system 3A are as follows: The surfaces of the lenses are numbered sequentially from the demagnifying side toward the magnifying side. A surface having a surface number with * is an aspheric surface. The surface number 1 represents the demagnifying-side surface of the cross dichroic prism 19, and the surface number 2 represents the magnifying-side surface thereof. The fields labeled with the surface number 10 show dummy data. The fields labeled with the surface number 33 show dummy data. The row of the reference characters represents the reference characters of the lenses. The reference characters given in the second optical system 32 are the reference characters of the first transmissive surface 41, the reflective surface 42, and the second transmissive surface 43. That is, the surface number 34 represents the first transmissive surface 41 of the lens 35. The surface number 36 represents the reflective surface 42 of the lens 35. The surface number 38 represents the second transmissive surface 43 of the lens 35. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Reference character | r | d | nd | vd | Y | X |
|---|---|---|---|---|---|---|---|
| Object plane | | 0 | 9.39 | | | 12.477 | 12.477 |
| 1 | | 0 | 25.91 | 1.516331 | 64.14 | 12.477 | 12.477 |
| 2 | | 0 | 0.1 | | | 14.468 | 14.468 |
| 3 | L1 | 45.81923 | 4.528921 | 1.746285 | 48.74 | 14.982 | 14.982 |
| 4 | | −103.19146 | 0.1 | | | 14.78 | 14.78 |
| 5 | L2 | 24.9068 | 8.528597 | 1.733169 | 53.3 | 13.578 | 13.578 |
| 6 | | 214.56324 | 0.737898 | | | 11.663 | 11.663 |
| 7 | L3 | 21.91152 | 5.780363 | 1.601946 | 62.08 | 9.675 | 9.675 |
| 8 | L4 | −38.95892 | 1.548897 | 1.78513 | 25.38 | 7.933 | 7.933 |
| 9 | | 23.78374 | 0.847466 | | | 6.291 | 6.291 |
| 10 | dummy | 0 | 0.62299 | | | 6.291 | 6.291 |
| *11 | L5 | −22.66424 | 0.65 | 1.67182 | 30.04 | 6.291 | 6.291 |
| *12 | | 188.46979 | 1.729032 | | | 5.812 | 5.812 |
| Stop plane | | 0 | 13.295 | | | 5.32 | 5.32 |
| 14 | L6 | −218.18445 | 8.149063 | 1.825535 | 43.57 | 11.438 | 11.438 |
| 15 | | −32.69228 | 17.367229 | | | 13.488 | 13.488 |
| 16 | L7 | 29.90998 | 14.996854 | 1.437002 | 95.1 | 22.918 | 22.918 |
| 17 | | 66.93367 | 29.331935 | | | 21.5 | 21.5 |
| *18 | L8 | −18.73467 | 4 | 1.531132 | 55.75 | 19.653 | 19.653 |
| *19 | | −45.52656 | 27.25192 | | | 19.716 | 19.716 |
| 20 | L9 | 102.65899 | 5.767492 | 1.812176 | 34.69 | 26.6 | 26.6 |
| 21 | L10 | 36.46542 | 19.447811 | 1.750635 | 35.46 | 26.765 | 26.765 |
| 22 | | −66.0744 | 0.595472 | | | 26.874 | 26.874 |
| 23 | L11 | 33.36894 | 20 | 1.703337 | 54.81 | 22.818 | 22.818 |
| 24 | L12 | −33.84206 | 9.5 | 1.840996 | 30.12 | 20.908 | 20.908 |
| 25 | | 32.80872 | 16.898419 | | | 15.96 | 15.96 |
| 26 | L13 | −70.65615 | 6.464956 | 1.806197 | 45.53 | 11.676 | 11.676 |
| 27 | | −37.29305 | 1.688118 | | | 13.75 | 13.75 |
| 28 | L14 | −781.94522 | 9.5 | 1.842804 | 26.63 | 15.663 | 15.663 |
| 29 | L15 | 49.59867 | 8.481568 | 1.752689 | 52.42 | 18.912 | 18.912 |
| 30 | | −51.86738 | 46.55 | | | 19.21 | 19.21 |
| 31 | L16 | 45.15531 | 15 | 1.736923 | 53.13 | 32.061 | 32.061 |
| 32 | | 450.42926 | 3.99 | | | 31.251 | 31.251 |
| 33 | dummy | 0 | 6.65 | | | 29.82 | 29.82 |
| *34 | 41 | −206.20608 | 40 | 1.531132 | 55.75 | 25.837 | 25.837 |
| 35 | | 0 | 0 | 1.531132 | 55.75 | 20.122 | 20.122 |
| *36 | 42 | −15.09592 | 0 | 1.531132 | 55.75 | 20.015 | 20.015 |
| 37 | | 0 | −40 | 1.531132 | 55.75 | 45.491 | 45.491 |
| *38 | 43 | 64.80508 | −210 | | | 39.605 | 39.605 |
| Image plane | | 0 | 0 | | | 1449.462 | 1449.462 |

As shown in the lens data, the refractive index nd of the lens 35 is 1.531132, and the Abbe number vd of the lens 35 is 55.75. The field of the on-axis inter-surface distance d labeled with the surface number 38 shows the distance between the screen S and the second transmissive surface 43 of the lens 35. The field of the on-axis inter-surface distance d labeled with the surface number 38 therefore shows the projection distance f of the projection system 3A. In the present embodiment, f=210 mm. In the present embodiment, the effective radius of the reflective surface 42 is 20.015 mm in the axis-Y direction and 20.015 mm in the axis-X direction.

Aspheric data of the surface number 11 are as follows.

| Conic constant | 0 |
|---|---|
| Fourth-order coefficient | 3.984535E−04 |
| Sixth-order coefficient | −1.341724E−05 |
| Eighth-order coefficient | 3.630726E−07 |
| Tenth-order coefficient | −5.941035E−09 |
| Twelfth-order coefficient | 4.21578E−11 |
| Fourteenth-order coefficient | 0 |

Aspheric data of the surface number 12 are as follows.

| Conic constant | −9.577E+01 |
|---|---|
| Fourth-order coefficient | 4.601732E−04 |
| Sixth-order coefficient | −1.254316E−05 |
| Eighth-order coefficient | 3.054374E−07 |

-continued

| Tenth-order coefficient | −3.99927E−09 |
|---|---|
| Twelfth-order coefficient | 9.398226E−12 |
| Fourteenth-order coefficient | 1.960283E−13 |

Aspheric data of the surface number 18 are as follows.

| Conic constant | −3.206999E−01 |
|---|---|
| Fourth-order coefficient | −5.213295E−05 |
| Sixth-order coefficient | 2.229516E−07 |
| Eighth-order coefficient | 3.649333E−11 |
| Tenth-order coefficient | −1.885998E−13 |

Aspheric data of the surface number 19 are as follows.

| Conic constant | −2.018082E+01 |
|---|---|
| Fourth-order coefficient | −9.768185E−05 |
| Sixth-order coefficient | 1.858496E−07 |
| Eighth-order coefficient | −1.718094E−10 |
| Tenth-order coefficient | 2.524251E−13 |

Aspheric data of the surface number 34 are as follows.

| Conic constant | 0 |
|---|---|
| Fourth-order coefficient | 1.884207E−05 |
| Sixth-order coefficient | −1.988902E−08 |

-continued

| | |
|---|---|
| Eighth-order coefficient | −8.905841E−13 |
| Tenth-order coefficient | 5.75249E−15 |

Aspheric data of the surface number 36 are as follows.

| | |
|---|---|
| Conic constant | −3.033319E+00 |
| Fourth-order coefficient | −7.255771E−06 |
| Sixth-order coefficient | 1.981525E−08 |
| Eighth-order coefficient | −5.213246E−12 |
| Tenth-order coefficient | −5.884124E−15 |

Aspheric data of the surface number 38 are as follows.

| | |
|---|---|
| Conic constant | 1.602088E+00 |
| Fourth-order coefficient | 1.179409E−06 |
| Sixth-order coefficient | −8.755677E−11 |
| Eighth-order coefficient | −1.833363E−13 |
| Tenth-order coefficient | 1.231209E−16 |

In the projection system 3A according to the present embodiment, the lens 35, which forms the second optical system 32, has the reflective surface 42 with concave shape and the second transmissive surface 43 with convex shape protruding toward the magnifying side. The light fluxes reflected off the reflective surface 42 are refracted by the second transmissive surface 43. Therefore, the projection distance of the projection system 3A is readily shortened, as compared with a case where the second optical system 32 has only the reflective surface 42.

Further, in the present embodiment, an increase in the size of the reflective surface 42, which is disposed on the magnifying side of the second intermediate image 34, can be suppressed even in the case of a short projection distance.

Figure 7:
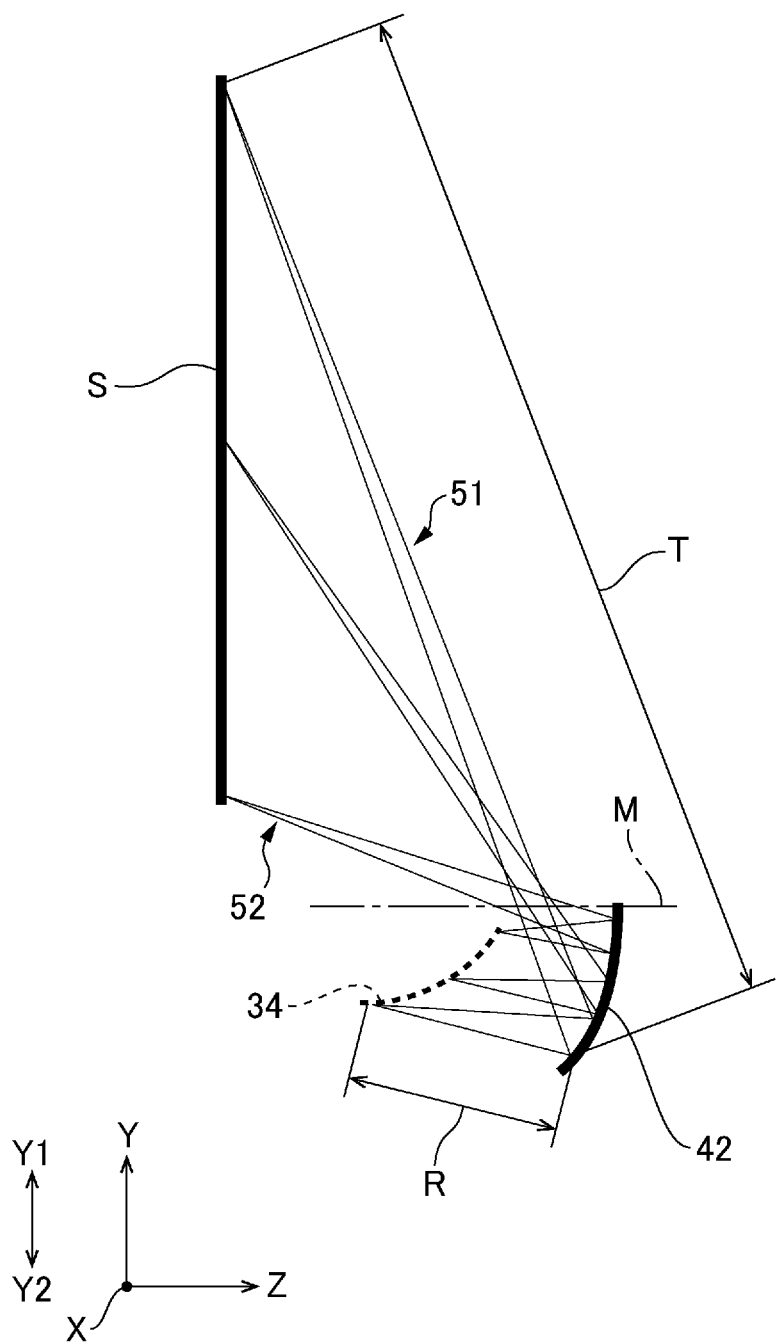
FIG. 7 describes the magnification of the projection system in a case where the second optical system has only a reflective surface.
Figure 8:
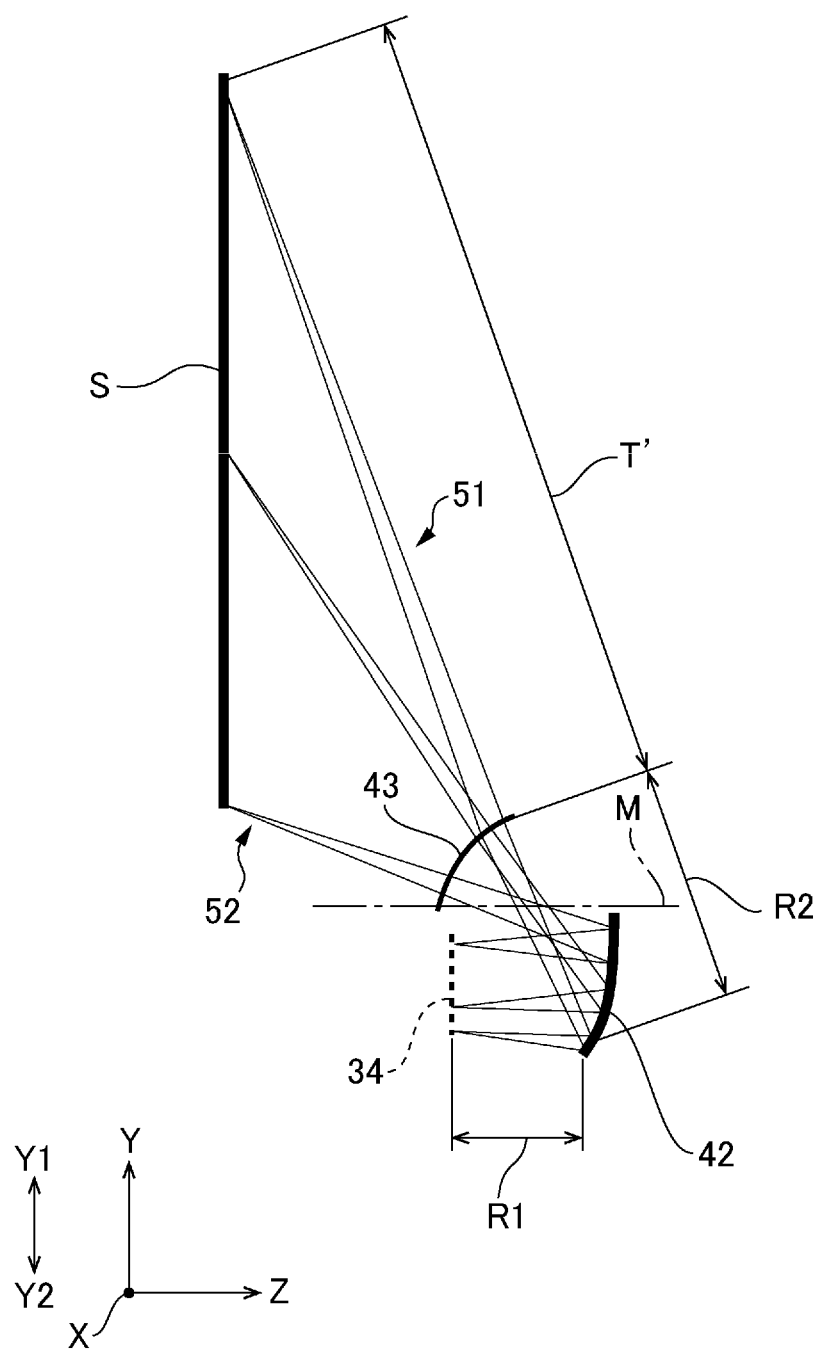
FIG. 8 describes the magnification of the projection system in a case where the second optical system has the reflective surface and a second transmissive surface which is disposed on the magnifying side of the reflective surface.

The effects described above will be described in detail with reference to FIGS. 7 and 8. FIG. 7 describes the magnification of the projection system in the case where the second optical system 32 has only the reflective surface 42 on the magnifying side of the second intermediate image 34. FIG. 8 describes the magnification of the projection system in the case where the second optical system 32 has the reflective surface 42 and the second transmissive surface 43 protruding toward the magnifying side on the magnifying side of the second intermediate image 34.

In the case where the second optical system 32 has only the reflective surface 42 on the magnifying side of the second intermediate image 34, the magnification Q of the projection system is represented by the ratio of T to R, where T is a distance from the reflective surface 42 to the screen S, and R is a distance between the second intermediate image 34 and the reflective surface 42 along the optical path of a specific part of the light rays from the second intermediate image 34 to the screen S, as shown in FIG. 7. That is, Q=T/R. The second intermediate image 34, which is conjugate with the screen S which corresponds to the magnifying-side image formation plane, greatly inclines so that the magnification Q of each of light fluxes is equal and has field curvature due to the inclination. The size of the second intermediate image 34 increases as the second intermediate image 34 inclines. When the size of the second intermediate image 34 increases, it is necessary to increase the size of the reflective surface 42 located at the magnifying side of second intermediate image 34. Therefore, in the projection system having only the concave reflective surface 42 on the magnifying side of the second intermediate image 34, shortening the projection distance causes an increase in the size of the reflective surface 42. The size of the second intermediate image 34 increases as the second intermediate image 34 inclines, as described above. This means that a wider distance between the first optical system 31 and the second optical system 32 is necessary, resulting in an increase in the overall length of the projection system 3A.

In contrast, in the present embodiment, in which the second optical system 32 has the second transmissive surface 43 protruding toward the magnifying side on the magnifying side of the reflective surface 42, an increase in the size of the second intermediate image 34 can be suppressed. That is, in the present embodiment, the magnification Q of the projection system 3A is represented by the ratio of T' to (R1+R2), where T' is a distance between the second transmissive surface 43 and the screen S, R1 is a distance between the second intermediate image 34 and the reflective surface 42 along the optical path of a specific part of the light ray from the second intermediate image 34 to the screen S, and R2 is a distance between the reflective surface 42 and the second transmissive surface 43, as shown in FIG. 8. That is, Q=T'/(R1+R2). The second intermediate image 34, which is conjugate with the screen S which corresponds to the magnifying-side image formation plane, therefore does not greatly incline and has reduced field curvature. An increase in the size of the second intermediate image 34 can therefore be suppressed. As a result, an increase in the size of the reflective surface 42, which is located at the magnifying side of the second intermediate image 34, can be suppressed. Further, if the upper-end light flux 51 can be refracted inward when passing through the first transmissive surface 41, the size of the reflective surface 42 can be further reduced. Moreover, the second transmissive surface 43, which has positive power, causes the light flux to be convergent, whereby an increase in the size of the reflective surface 42 can be suppressed, as compared with the case where no second transmissive surface 43 is provided.

Further, in the present embodiment, the sixteenth lens L16, which is located in a position closest to the magnifying side in the first optical system 31, has positive power, as shown in FIG. 5. The principal rays between the first optical system 31 and the second optical system 32 therefore approach each other toward the second optical system 32. Therefore, the second intermediate image 34 is readily formed, and the size of the second intermediate image 34 can be reduced. The size of the reflective surface 42, which is located at the magnifying side of the second intermediate image 34, can therefore be further reduced.

Further, in the present embodiment, the second intermediate image 34 is located in the lens 35 between the first transmissive surface 41 and the reflective surface 42. The first optical system 31 can be closer to the lens 35 than in a case where the second intermediate image 34 is formed on the demagnifying side of the first transmissive surface 41 The overall length of the projection system 3A can therefore be shortened.

In the present embodiment, the first optical system 31 includes two aspheric lenses. Further, the first transmissive surface 41, the reflective surface 42, and the second transmissive surface 43 of the second optical system 32 are each an aspheric surface. Aberrations produced by the projection system 3A according to the present embodiment can therefore be suppressed.

Further, in the present embodiment, since the first transmissive surface 41, which is adjacent to the second intermediate image 34 on the demagnifying side, is an aspheric surface, aberrations produced in the position of the intermediate image 33 can be suppressed. Moreover, in the present embodiment, since the second optical system 32 has the second transmissive surface 43 protruding toward the magnifying side on the magnifying side of the reflective surface 42, the second intermediate image 34 does not greatly incline. In other words, in the present embodiment, the second intermediate image 34 extends in the direction perpendicular to the imaginary axis M. Therefore, according to the present embodiment, the first transmissive surface 41 and the second intermediate image 34 can readily approach each other in the axis-Z direction, whereby the aspheric surface can be disposed in a position close to the second intermediate image 34. Aberrations produced in the position of the second intermediate image 34 can therefore be efficiently corrected.

In the present embodiment, the lens 35, which forms the second optical system 32, satisfies the following conditional expressions (1) and (2), as shown in FIG. 6:

$$0°<\theta<90°+\gamma \quad (1)$$

$$90°<\theta \quad (2)$$

θ: Inclination angle over which an end of the imaginary line P facing the upper intersection 53 rotates counterclockwise relative to the imaginary vertical line V around the intersection of the imaginary vertical line V and the imaginary line P γ: angle from the imaginary axis M to the lower peripheral light ray 52b passing through the effective range 50 of the second transmissive surface 43 and intersects the imaginary axis M.

That is, in the present embodiment, the imaginary line P inclines by 120.284° with respect to the imaginary vertical line V. In other words, in the present embodiment, the pupil 44 of the lens inclines by 120.284° with respect to the imaginary vertical line V. Therefore, θ=120.284°, which satisfies the conditional expressions (1) and (2).

In the present embodiment, in which the conditional expression (1) is satisfied, the pupil inclines with respect to the imaginary vertical line V. In a case where θ=0° in the conditional expression (1), the imaginary line P is perpendicular to the imaginary axis M. That is, the pupil is perpendicular to the design reference axis. In a case where θ is greater than the upper limit in the conditional expression (1), the lower-end light flux 52 is blocked. In the present embodiment, in which the conditional expression (1) is satisfied, the lower-end light flux 52 passing through the lower end of the effective range 50 of the second transmissive surface 43 is not blocked and reaches the screen S.

Further, since the lens 35 according to the present embodiment satisfies the conditional expression (1), a decrease of brightness at the upper periphery of the screen S can be suppressed, as compared with a case where the imaginary line P is parallel to the imaginary vertical line V.

That is, in the case where the pupil 44 is perpendicular to the imaginary axis M, a divergence angle θ0 of a light flux that reaches an upper portion of the screen S decreases as the angle of view on the magnifying side increases. The divergence angle θ0 is shown in FIGS. 3 and 4. Further, the difference in the divergence angle θ0 between the light flux that reaches the upper portion of the screen S and a light flux that reaches a lower portion of the screen S increases. As a result, the amount of light at the upper periphery of the screen S is smaller than the amount of light at the lower periphery of the screen S.

On the other hand, in the present embodiment, in which the conditional expression (1) is satisfied, the pupil 44 inclines with respect to the imaginary vertical line V, which is perpendicular to the imaginary line P. As a result, the divergence angle θ0 of the light flux that reaches the upper portion of the screen S increases. The amount of light that reaches the upper portion of the screen S therefore increases. Further, when the divergence angle θ0 of the light flux that reaches the upper portion of the screen S increases, the difference in the divergence angle θ0 between the light flux that reaches the upper portion of the image formation plane and the light flux that reaches the lower portion of the image formation plane decreases. The situation in which the amount of light at the upper periphery of the screen S is smaller than the amount of light at the lower periphery of the screen S can therefore be suppressed.

In addition to the above, since the lens 35 according to the present embodiment satisfies the conditional expression (2), the divergence angle θ0 of the light flux that reaches the lower portion of the screen S decreases. The difference in the divergence angle θ0 between the light flux that reaches the upper portion of the screen S and the light flux that reaches the lower portion of the screen S therefore decreases, whereby the difference in the amount of light between the upper portion and the lower portion of the screen S can be suppressed.

Figure 9:
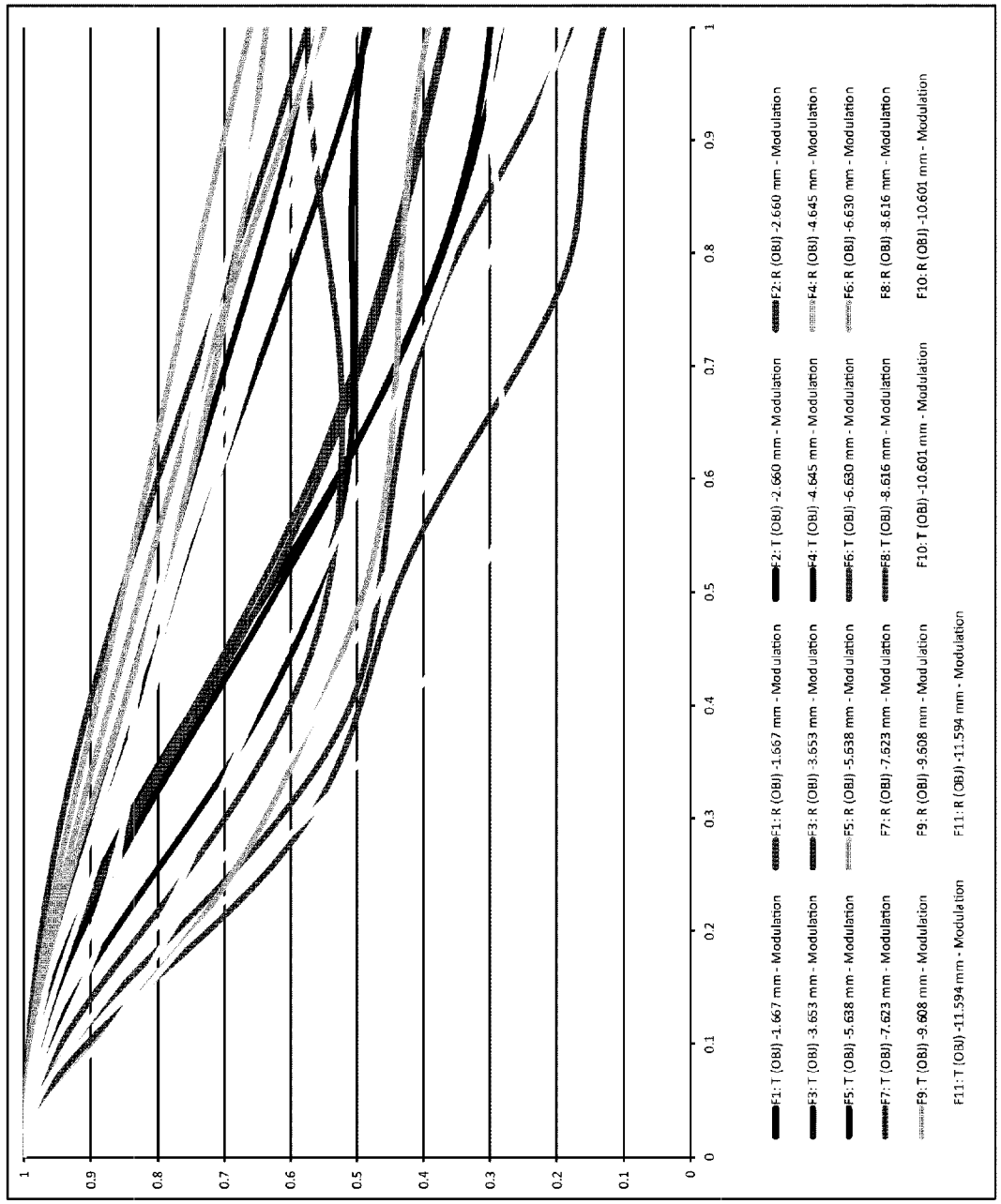
FIG. 9 shows an MTF of the projection system according to Embodiment 1 on the magnifying side.
Figure 10:
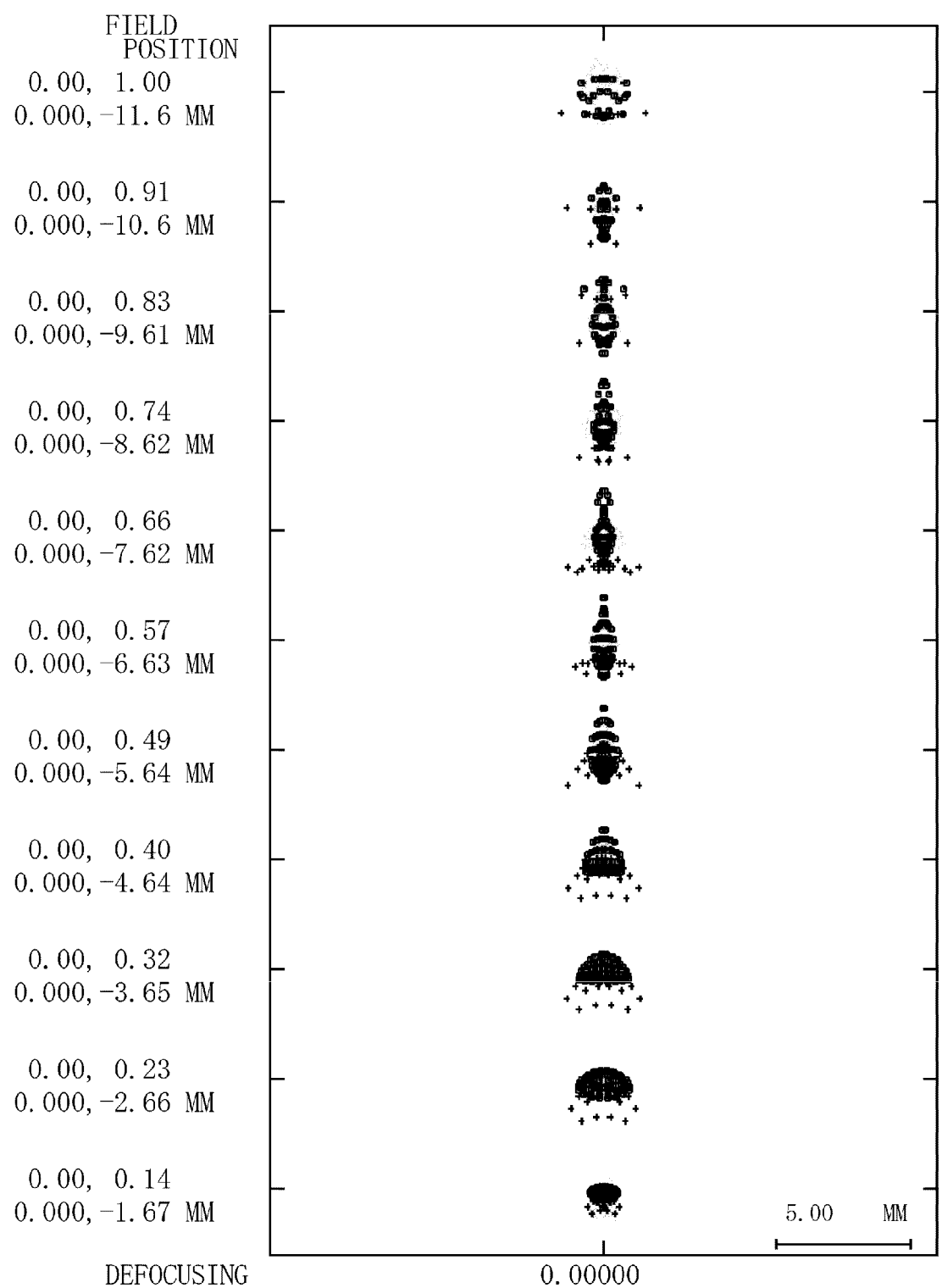
FIG. 10 is a spot diagram showing spots produced by the projection system according to Embodiment 1.

FIG. 9 shows an MTF of the projection system 3A on the magnifying side. The MTF was calculated under the following conditions: The image formation planes were divided along the axis Y; and the resultant halves were each divided into 11 areas. Light rays used in the calculation of the MTF are so weighted that the weighting ratio among light rays having a wavelength of 620 nm, light rays having a wavelength of 550 nm, and light rays having a wavelength of 470 nm is 2:7:1. The horizontal axis of FIG. 9, which shows the MTF, represents the spatial frequency. A spatial frequency of 0.24 cycles corresponds to a resolution of 16.7 μm. The vertical axis of FIG. 9 represents a contrast reproduction ratio. In the present embodiment, a decrease in resolution is suppressed, as shown in FIG. 9. FIG. 10 is a spot diagram showing spots produced by the projection system 3A. In the present embodiment, variation in the size of the spots is suppressed, as shown in FIG. 10.

Comparative Embodiment

The fact that the projection system 3A can provide the effect of suppressing an increase in the size of the reflective surface 42 disposed on the magnifying side of the second intermediate image 34 even in the case of a short projection distance will be shown below as compared with Comparative Embodiment.

Figure 11:
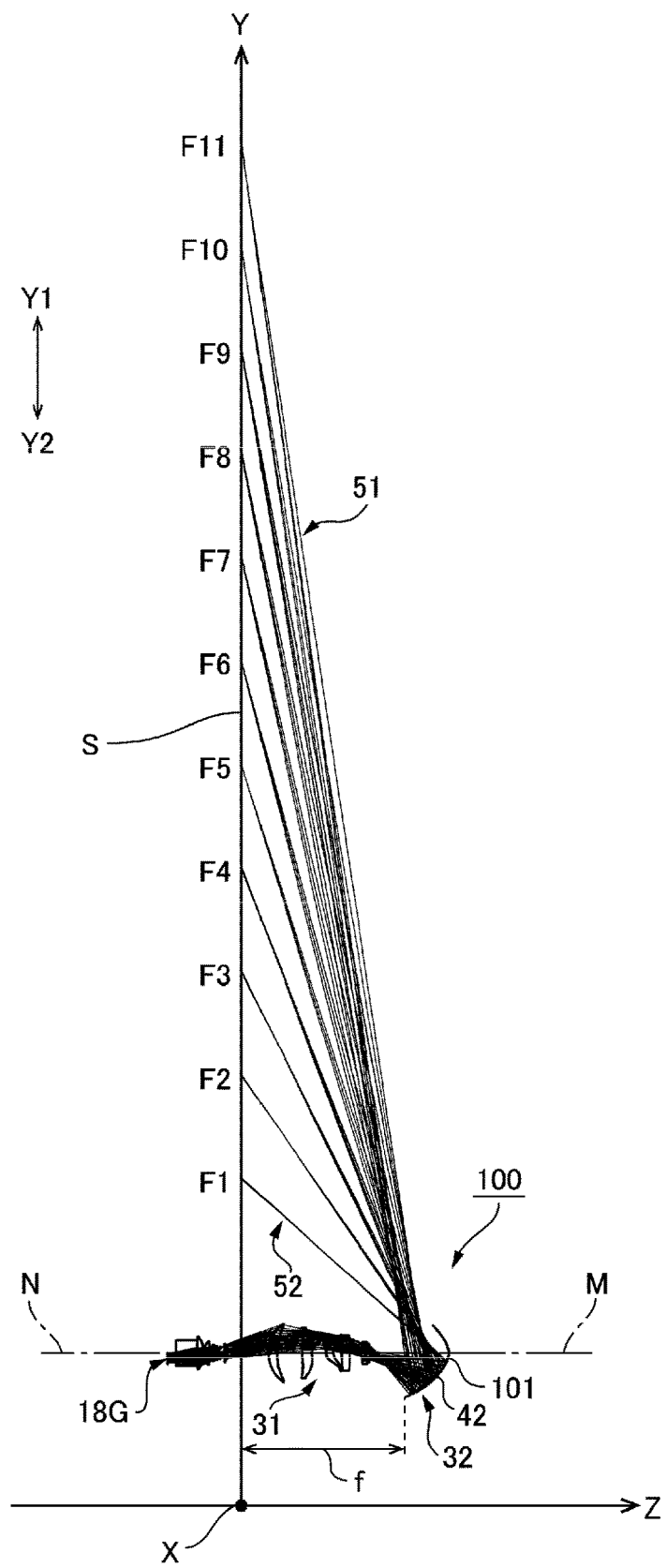
FIG. 11 is a light ray diagram of a projection system according to Comparative Embodiment.
Figure 12:
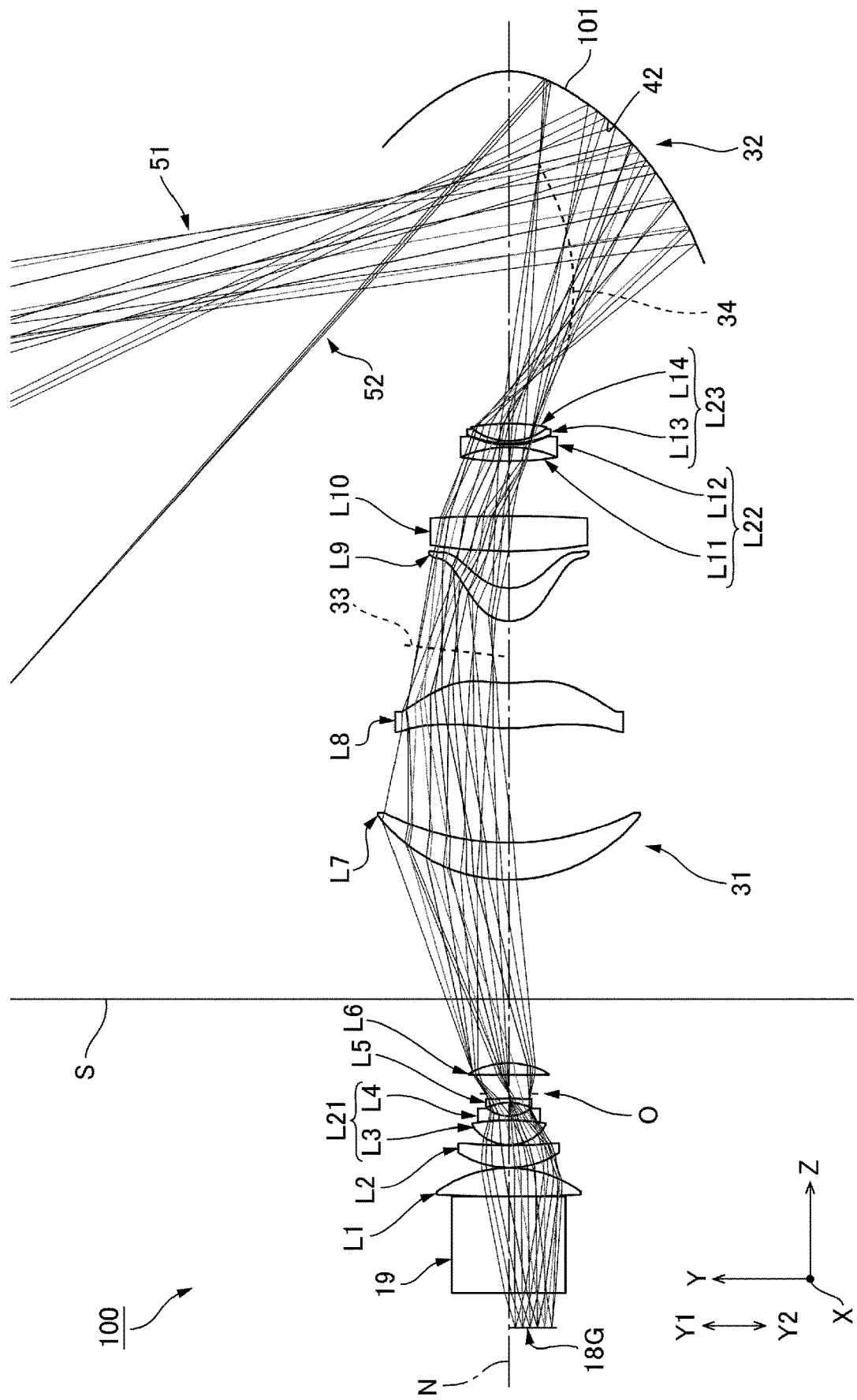
FIG. 12 is a light ray diagram of the projection system according to Comparative Embodiment enlarged.

Comparative Embodiment relates to a projection system in which the second optical system is formed only of a reflection mirror having a reflective surface. FIG. 11 is a light ray diagram of the projection system according to Comparative Embodiment. FIG. 12 is a light ray diagram of the projection system according to Comparative Embodiment enlarged. FIG. 11 diagrammatically shows 11 light fluxes F1 to F11, which exit out of a projection system 100 according to Comparative Embodiment and reach the screen S. The light flux F1 is a light flux that reaches the lowest image height position. The light flux F11 is a light flux that reaches the highest image height position. The light fluxes F2 to F10 are light fluxes that reach height positions between the height position that the light flux F1 reaches and the height position that the light flux F11 reaches. The projection system 100 according to Comparative Embodiment has a configuration corresponding to the projection system described in WO 2013/005444 having been described as related art. The projection system 100 according to Comparative Embodiment further has a configuration corresponding to the projection system 3A in the embodiment described above, and the corresponding components have the same reference characters in the following description.

The projection system 100 according to the present embodiment is formed of the first optical system 31 and the second optical system 32 sequentially arranged from the demagnifying side toward the magnifying side, as shown in FIG. 11. The projection system 100 forms the first intermediate image 33 and the second intermediate image 34 in positions between the demagnifying-side image formation plane and the magnifying-side image formation plane, as shown in FIG. 12.

The first optical system 31 is a refractive optical system including a plurality of lenses. The second optical system 32 is a reflection mirror 101 having a reflective surface. The liquid crystal panels 18R, 18G, and 18B of the image formation section 2 are disposed in the demagnifying-side image formation plane. FIGS. 11 and 12 show the liquid crystal panel 18G, which is one of the three liquid crystal panels 18R, 18G, and 18B.

The first intermediate image 33 is located at the demagnifying side of the second intermediate image 34. The first intermediate image 33 is formed in the first optical system 31. The second intermediate image 34 is formed in a position between the first optical system 31 and the reflection mirror 101.

The liquid crystal panels 18R, 18G, and 18B form projection images on one side of the optical axis N of the first optical system 31 in the demagnifying-side image formation. The first intermediate image 33 is located at the side opposite the projection images with respect to the optical axis N. The second intermediate image 34 is located at the one side of the optical axis N of the first optical system 31.

The screen S is disposed in the magnifying-side image formation plane. A final image projected on the screen S has an oblong shape elongated in the lateral direction. In the present embodiment, the final image has an aspect ratio of 16:10.

The first optical system 31 includes the cross dichroic prism 19 and 14 lenses L1 to L14, as shown in FIG. 12. The first lens L1 to the fourteenth lens L14 are arranged in the presented order from the demagnifying side toward the magnifying side. In the present embodiment, the third lens L3 and the fourth lens L4 are bonded to each other to form a first doublet L21. The eleventh lens L11 and the twelfth lens L12 are bonded to each other to form the second doublet L22. The thirteenth lens L13 and the fourteenth lens L14 are bonded to each other to form the third doublet L23. The stop O is disposed between the fourth lens L4 and the fifth lens L5. In the present embodiment, the sixth lens L6, the ninth lens L9, and the tenth lens L10 are three lenses that are each an aspheric lens having aspheric surfaces on both surfaces. The first intermediate image 33 is located in a position between the eighth lens L8 and the ninth lens L9.

The second optical system 32 is formed of the reflection mirror 101 having the reflective surface 42. The reflective surface 42 is located at the lower side Y2 of the optical axis N of the first optical system 31. The reflective surface 42 is so shaped that the cross-sectional shape in the plane YZ shown in FIG. 12 is rotated around the optical axis N over the angular range of 90° toward one side and the other side of the axis-X direction. The reflective surface 42 is an aspheric surface.

The second intermediate image 34 is located in a position between the fourteenth lens L14 of the first optical system 31 and the reflection mirror 101 of the second optical system 32. The second intermediate image 34, which is conjugate with the screen S which corresponds to the magnifying-side image formation plane, greatly inclines so that the magnification Q of each of light fluxes is equal, as shown in FIG. 12. The second intermediate image 34 is a conjugate image that is an inverted final image turned upside down. The second intermediate image 34 is so distorted that an oblong final image is projected on the screen S, which is the magnifying-side image formation plane. More specifically, the second intermediate image 34 has a shape so distorted as to correct trapezoidal distortion of the final image formed on the screen S. That is, the second intermediate image 34 has distortion opposite the trapezoidal distortion of the final image. The second intermediate image 34 is therefore so formed that the shortest edge thereof is the edge having the highest image height on the screen S.

In the present embodiment, the principal rays between the first optical system 31 and the second optical system. 32 do not approach each other toward the second optical system 32.

Lens Data

Data on the lenses of the projection system 100 are as follows: The surfaces of the lenses are numbered sequentially from the demagnifying side toward the magnifying side. The surface number 1 represents the demagnifying-side surface of the cross dichroic prism 19, and the surface number 2 represents the magnifying-side surface thereof. The fields labeled with the surface number 29 show dummy data. The reference characters given in the first optical system 31 are the reference characters of the lenses thereof. The row of the reference character represents the reference character of the reflective surface 42. That is, the surface number 30 represents the reflective surface 42 of the reflection mirror 101. The fields labeled with the surface number 29 show dummy data. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Reference character | r | d | nd | vd | Y | X |
|---|---|---|---|---|---|---|---|
| Object plane | | 0 | 9.5 | | | | |
| 1 | | 0 | 25.91 | 1.516331 | 64.14 | 12.493 | 12.493 |
| 2 | | 0 | 0.1 | | | 14.105 | 14.105 |
| 3 | L1 | 385.28287 | 7.715781 | 1.755522 | 52.24 | 18 | 18 |
| 4 | | −32.19703 | 0.1 | | | 14.294 | 14.294 |
| 5 | L2 | 24.34597 | 6.029905 | 1.782406 | 48.34 | 12.468 | 12.468 |

-continued

| Surface number | Reference character | r | d | nd | vd | Y | X |
|---|---|---|---|---|---|---|---|
| 6 | | 134.67421 | 0.1 | | | 11.376 | 11.376 |
| 7 | L3 | 11.83486 | 6.511584 | 1.511238 | 74.19 | 9.023 | 9.023 |
| 8 | L4 | −59.29659 | 1.106077 | 1.846021 | 24.36 | 7.581 | 7.581 |
| 9 | | 9.12072 | 3.649323 | | | 5.672 | 5.672 |
| *10 | L6 | −10.67337 | 1.070397 | 1.634872 | 32.44 | 5.5 | 5.5 |
| *11 | | −38.95392 | 1.307688 | | | 5.544 | 5.544 |
| Stop plane | | 0 | 5.175353 | | | 6.363 | 6.363 |
| 13 | L7 | −457.06679 | 3.148942 | 1.840223 | 31.26 | 9.5 | 9.5 |
| 14 | | −20.59587 | 49.281702 | | | 9.829 | 9.829 |
| 15 | L8 | 43.87342 | 10 | 1.755001 | 52.32 | 33.957 | 33.957 |
| 16 | | 72.56715 | 30.890986 | | | 33.295 | 33.295 |
| *17 | L9 | 39.52491 | 12.16685 | 1.531132 | 55.75 | 28.854 | 28.854 |
| *18 | | 40.62909 | 16.608409 | | | 28.717 | 28.717 |
| *19 | L10 | 10.05479 | 8.955658 | 1.531132 | 55.75 | 20.393 | 20.393 |
| *20 | | 11.32122 | 10 | | | 19.97 | 19.97 |
| 21 | L11 | 136.24056 | 9.5 | 1.846663 | 23.78 | 19.665 | 19.665 |
| 22 | | −371.83957 | 14.693499 | | | 18.32 | 18.32 |
| 23 | L12 | 80.14834 | 3.721799 | 1.834805 | 42.72 | 12 | 12 |
| 24 | L13 | −32.75685 | 0.6 | 1.672834 | 29.98 | 11.855 | 11.855 |
| 25 | | 24.41159 | 0.454148 | | | 10.251 | 10.251 |
| 26 | L14 | 28.56854 | 0.6 | 1.846663 | 23.78 | 10.231 | 10.231 |
| 27 | L15 | 15.99595 | 4.697545 | 1.834805 | 42.72 | 9.656 | 9.656 |
| 28 | | −53.85223 | 14.804806 | | | 9.477 | 9.477 |
| 29 | dummy | 0 | 80.198619 | | | 13.281 | 13.281 |
| *30 | 42 | −19.85192 | −250 | | | 50.069 | 50.069 |
| Image plane | | 0 | 0 | | | 1450.484 | 1450.484 |

As shown in the lens data, the field of the on-axis inter-surface distance d labeled with the surface number 30 shows the distance between the screen S and the reflective surface 42. The field of the on-axis inter-surface distance d labeled with the surface number 30 therefore shows the projection distance f of the projection system 100. In the present embodiment, f=250 mm. In the present embodiment, the effective radius of the reflective surface 42 is 50.069 mm in the axis-Y direction and 50.069 mm in the axis-X direction.

Aspheric data of the surface number 10 are as follows.

| | |
|---|---|
| Conic constant | 0 |
| Fourth-order coefficient | 6.95074E−04 |
| Sixth-order coefficient | −1.956818E−05 |
| Eighth-order coefficient | 5.246844E−07 |
| Tenth-order coefficient | −9.446898E−09 |
| Twelfth-order coefficient | 7.822572E−11 |
| Fourteenth-order coefficient | 0 |

Aspheric data of the surface number 11 are as follows.

| | |
|---|---|
| Conic constant | −9.577E+01 |
| Fourth-order coefficient | 3.719487E−04 |
| Sixth-order coefficient | −1.085786E−05 |
| Eighth-order coefficient | 1.260707E−07 |
| Tenth-order coefficient | 2.518839E−09 |
| Twelfth-order coefficient | −1.203071E−10 |
| Fourteenth-order coefficient | 1.278031E−12 |

Aspheric data of the surface number 17 are as follows.

| | |
|---|---|
| Conic constant | 0 |
| Fourth-order coefficient | −6.086748E−05 |
| Sixth-order coefficient | 1.312061E−07 |
| Eighth-order coefficient | −1.493418E−10 |
| Tenth-order coefficient | 6.235755E−14 |

Aspheric data of the surface number 18 are as follows.

| | |
|---|---|
| Conic constant | 0 |
| Fourth-order coefficient | −9.7759E−05 |
| Sixth-order coefficient | 1.907883E−07 |
| Eighth-order coefficient | −1.96061E−10 |
| Tenth-order coefficient | 8.006665E−14 |

Aspheric data of the surface number 19 are as follows.

| | |
|---|---|
| Conic constant | −8.232202E−01 |
| Fourth-order coefficient | 2.358652E−04 |
| Sixth-order coefficient | −1.089059E−06 |
| Eighth-order coefficient | 6.624513E−10 |
| Tenth-order coefficient | 6.378288E−13 |

Aspheric data of the surface number 20 are as follows.

| | |
|---|---|
| Conic constant | −7.196106E−01 |
| Fourth-order coefficient | 7.44572E−05 |
| Sixth-order coefficient | −8.73803E−07 |
| Eighth-order coefficient | 1.58603E−09 |
| Tenth-order coefficient | −1.245825E−12 |

Aspheric data of the surface number 30 are as follows.

| | |
|---|---|
| Conic constant | −3.019E+00 |
| Fourth-order coefficient | −4.606102E−06 |
| Sixth-order coefficient | 1.148322E−09 |
| Eighth-order coefficient | −2.050367E−13 |
| Tenth-order coefficient | −7.8437E−18 |

Figure 13:
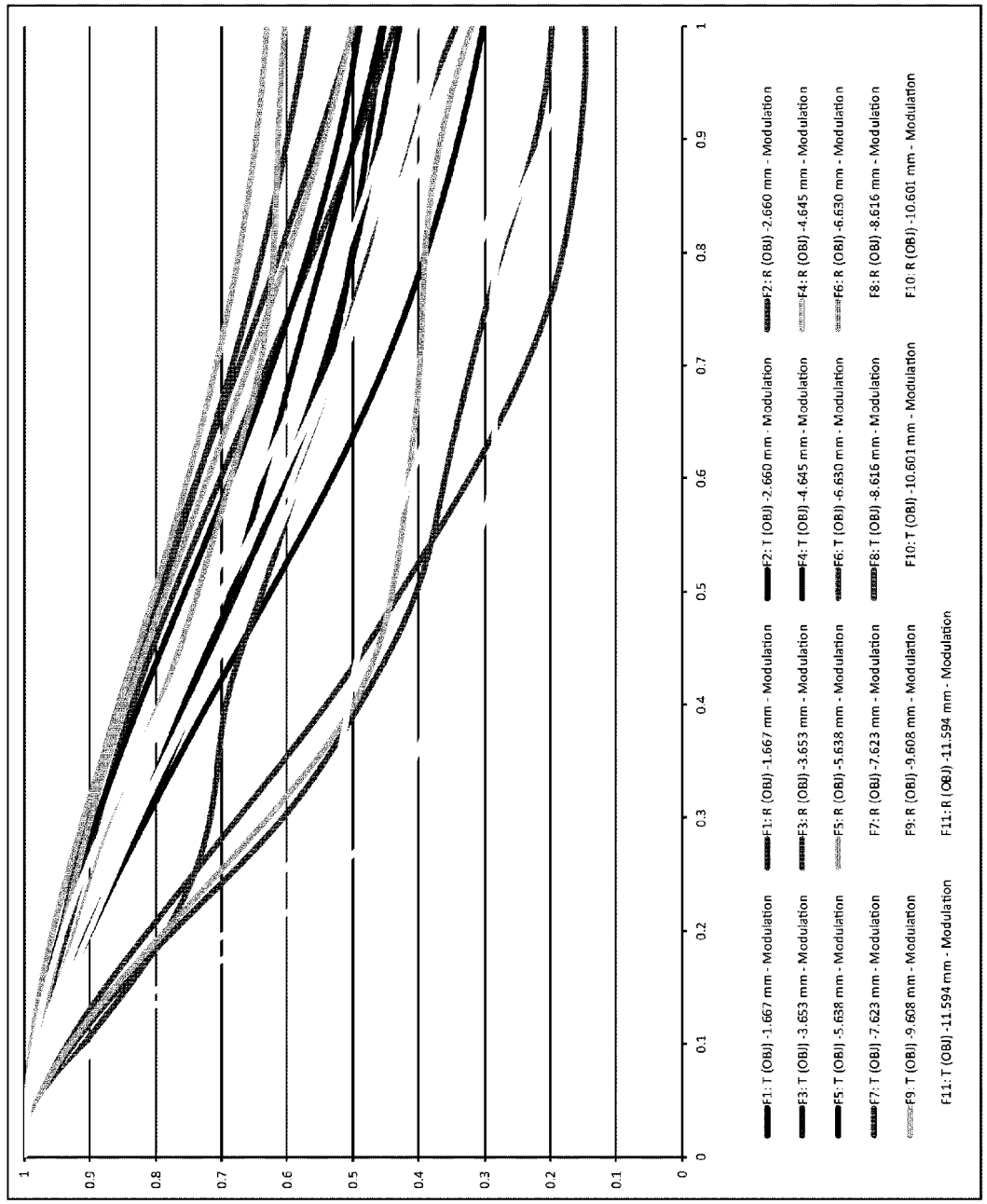
FIG. 13 shows an MTF of the projection system according to Comparative Embodiment on the magnifying side.
Figure 14:
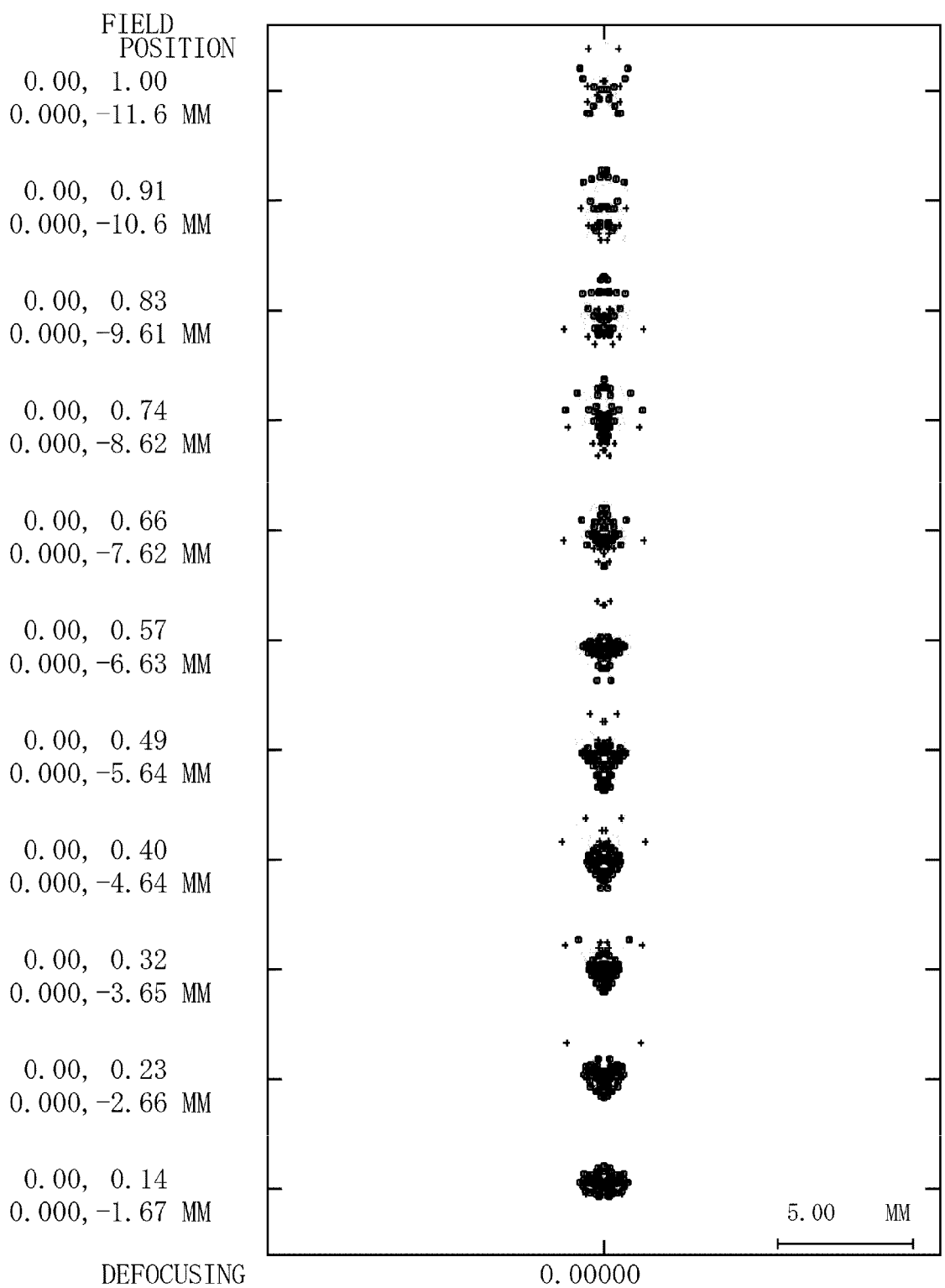
FIG. 14 is a spot diagram showing spots produced by the projection system according to Comparative Embodiment.

FIG. 13 shows an MTF of the projection system according to Comparative Embodiment on the magnifying side. FIG. 14 is a spot diagram showing spots produced by the projection system according to Comparative Embodiment.

The projection distance of the projection system 100 according to Comparative Embodiment is f=250 mm, as shown in the lens data. In the projection system 100 according to Comparative Embodiment, the effective radius of the reflective surface 42 is 50.069 mm in the axis-Y direction and 50.069 mm in the axis-X direction. In contrast, the projection distance of the projection system according to Embodiment 1 is f=210 mm. On the other hand, in the projection system 3A according to Embodiment 1, the effective radius of the reflective surface 42 is 20.015 mm in the axis-X direction and 20.015 mm in the axis-Y direction. The projection system 3A according to Embodiment 1 therefore allows suppression of an increase in the size of the reflective surface 42 even in the case of a short projection distance.

Embodiment 2

Figure 15:
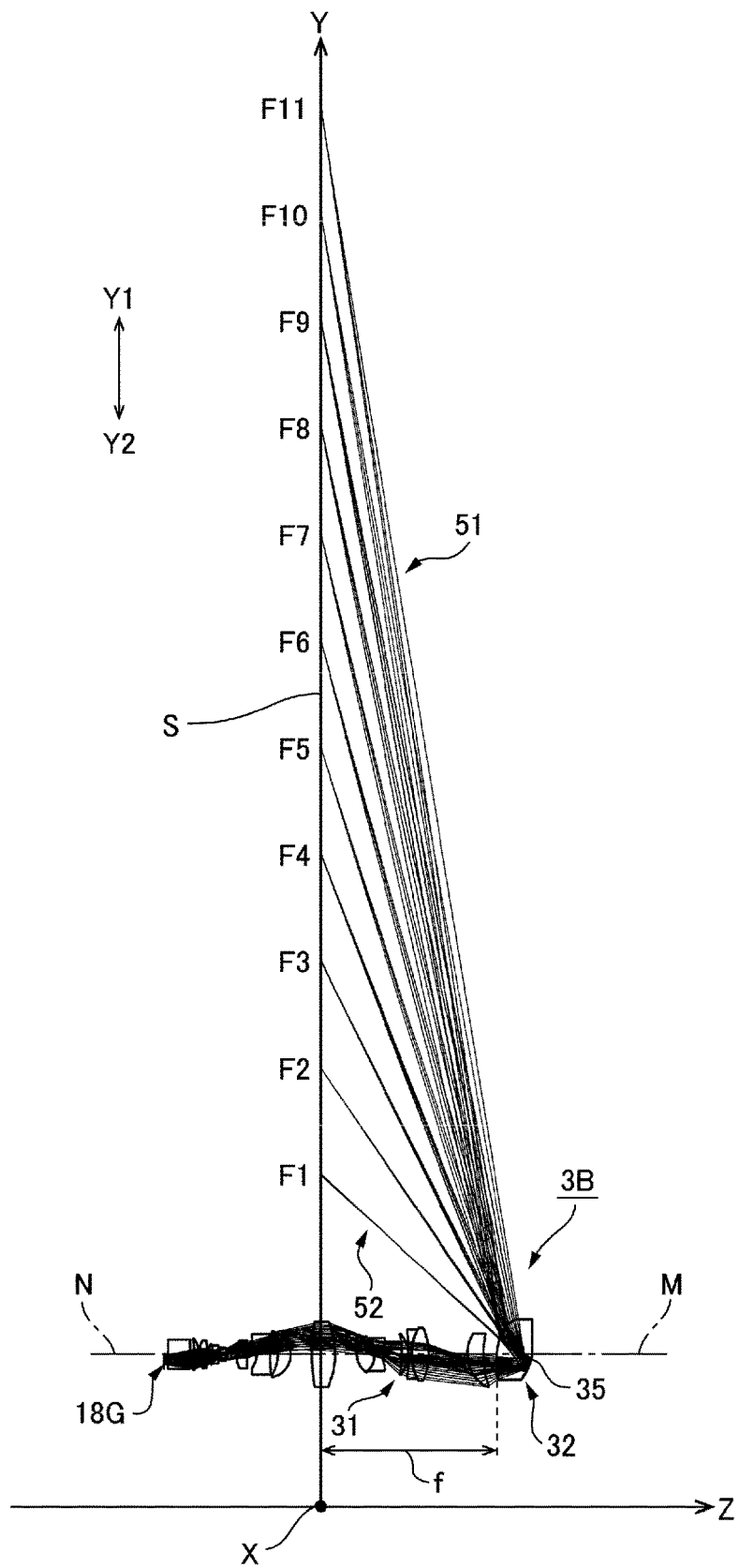
FIG. 15 is a light ray diagram of a projection system according to Embodiment 2.
Figure 16:
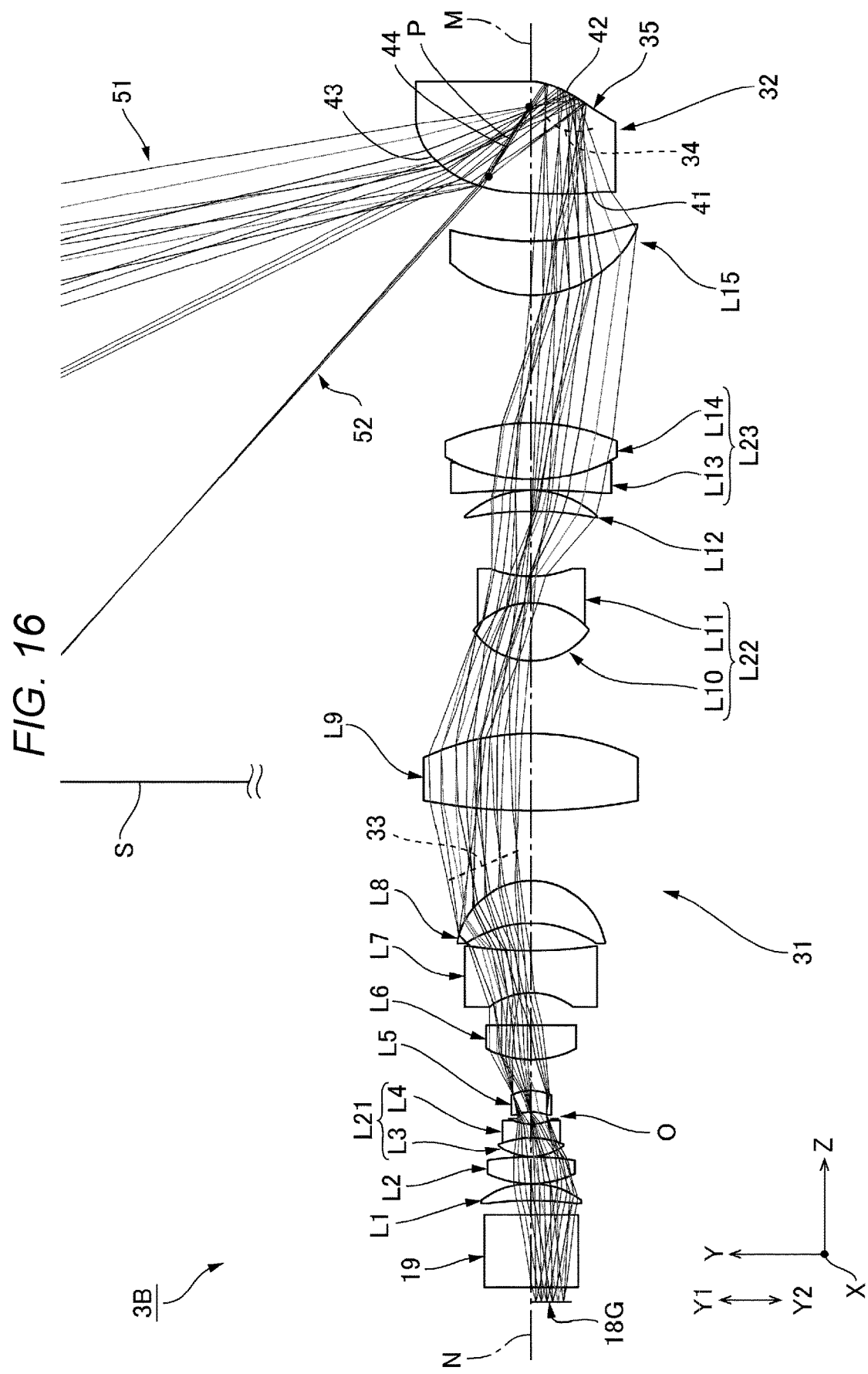
FIG. 16 is a light ray diagram of the projection system according to Embodiment 2 enlarged.
Figure 17:
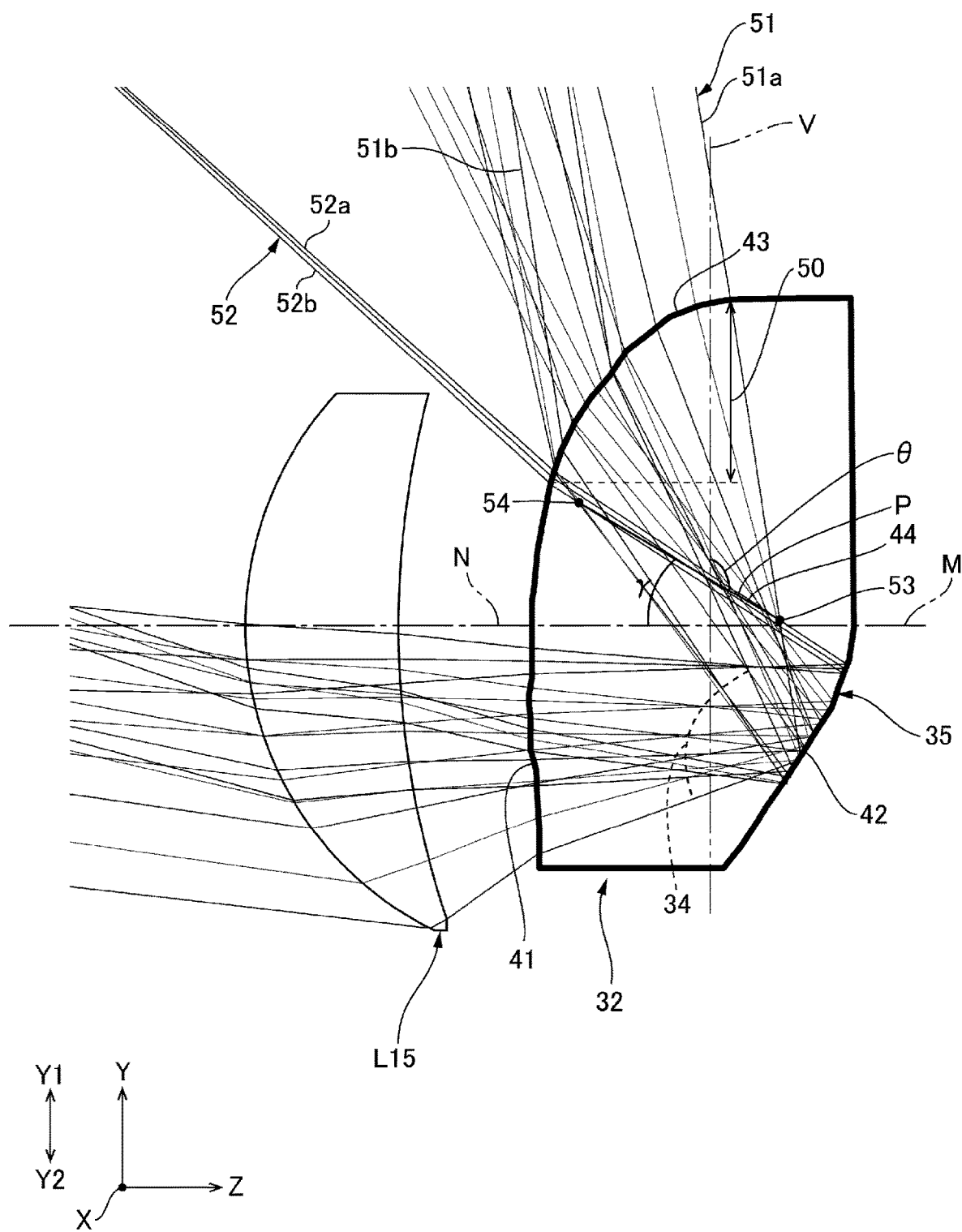
FIG. 17 is a light ray diagram with a portion including a second optical system of the projection system according to Embodiment 2 enlarged.

FIG. 15 is a light ray diagram of a projection system according to Embodiment 2 of the present disclosure. FIG. 16 is a light ray diagram of the projection system according to Embodiment 2 enlarged. FIG. 17 is a light ray diagram with a portion including a second optical system of the projection system according to Embodiment 2 enlarged. FIG. 15 diagrammatically shows 11 light fluxes F1 to F11, which exit out of a projection system 3B and reach the screen S. The light flux F1 is a light flux that reaches the lowest image height position. The light flux F11 is a light flux that reaches the highest image height position. The light fluxes F2 to F10 are light fluxes that reach height positions between the height position that the light flux F1 reaches and the height position that the light flux F11 reaches. The projection system 3B according to the present embodiment has a configuration corresponding to the projection system 3A in the embodiment described above, and the corresponding components therefore have the same reference characters in the following description.

The projection system 3B according to the present embodiment is formed of the first optical system 31 and the second optical system 32 sequentially arranged from the demagnifying side toward the magnifying side, as shown in FIG. 15. The projection system 3B forms the first intermediate image 33 and the second intermediate image 34 in positions between the demagnifying-side image formation plane and the magnifying-side image formation plane of the projection system 3B, as shown in FIG. 16.

The first optical system 31 is a refractive optical system including a plurality of lenses. The second optical system 32 is a lens 35. The liquid crystal panels 18R, 18G, and 18B of the image formation section 2 are disposed in the demagnifying-side image formation plane. FIGS. 15 and 16 show the liquid crystal panel 18G, which is one of the three liquid crystal panels 18R, 18G, and 18B.

The first intermediate image 33 is located at the demagnifying side of the second intermediate image 34. The first intermediate image 33 is formed in the first optical system 31. The second intermediate image 34 is formed in the second optical system 32, that is, the lens 35.

The liquid crystal panels 18R, 18G, and 18B form projection images on one side of the optical axis N of the first optical system 31 in the demagnifying-side image formation plane. The first intermediate image 33 is located at the other side of the optical axis N of the first optical system 31. The second intermediate image 34 is located at the one side of the optical axis N of the first optical system 31. That is, the projection images and the second intermediate image 34 are located at the one side of the optical axis N, and the first intermediate image 33 is located at the side opposite the projection images and the second intermediate image 34 with respect to the optical axis N.

The screen S is disposed in the magnifying-side image formation plane. A final image projected on the screen S has an oblong shape elongated in the lateral direction. In the present embodiment, the final image has an aspect ratio of 16:10.

The first optical system 31 includes the cross dichroic prism 19 and 15 lenses L1 to L15, as shown in FIG. 16. The first lens L1 to the fifteenth lens L15 are arranged in the presented order from the demagnifying side toward the magnifying side. In the present embodiment, the third lens L3 and the fourth lens L4 are bonded to each other to form the first doublet L21. The tenth lens L10 and the eleventh lens L11 are bonded to each other to form the second doublet L22. The thirteenth lens L13 and the fourteenth lens L14 are bonded to each other to form the third doublet L23. The stop O is disposed between the fourth lens L4 and the fifth lens L5. In the present embodiment, the lenses L1 to L15 are each a spherical lens.

In the first optical system 31, the fifteenth lens L15, which is located in a position closest to the magnifying side, has positive power. Since the fifteenth lens L15 has positive power in the first optical system 31, the principal rays between the first optical system 31 and the second optical system 32 approach each other toward the second optical system 32.

The lens 35, which forms the second optical system 32, is made of resin. The lens 35 has the first transmissive surface 41, the reflective surface 42, and the second transmissive surface 43 sequentially arranged from the demagnifying side toward the magnifying side, as shown in FIG. 17. In the case where the lens 35 is made of resin, the lens 35 can be manufactured in injection molding. The lens 35 having a complicated shape is therefore readily manufactured.

Also in the following description of the present embodiment, three axes perpendicular to one another are called the axes X, Y, and Z for convenience. A first direction in which the first transmissive surface 41 and the reflective surface 42 are arranged is called the axis-Z direction. A second direction, which is called an axis-y direction, coincides with the vertical direction of the screen S. One side of the axis Y is called the upper side Y1, and the other side of the axis Y is called the lower side Y2. A first plane perpendicular to the axis X and containing the axes Y and Z is called the plane YZ. FIGS. 15 to 17 therefore each show the plane YZ. The optical axis N of the first optical system 31 extends in the axis-Z direction. The image formation section 2 forms a projection image on the upper side Y1 of the optical axis N of the first optical system 31. The second intermediate image 34 is formed on the lower side Y2 of the optical axis N of the first optical system 31. The lateral direction of the screen S coincides with a third direction, which is called the axis-X direction. In the following description, the imaginary axis M extending in the axis-Z direction is set in the plane YZ. The imaginary axis M is the reference axis used in the design of the lens 35. The imaginary axis M is perpendicular to the screen S, which is the magnifying-side image formation plane. The imaginary axis M is substantially perpendicular to the screen S in some cases.

The first transmissive surface 41 and the reflective surface 42 are located at the lower side Y2 of the imaginary axis M. The second transmissive surface 43 is located at the upper side Y1 of the imaginary axis M. The reflective surface 42 has a concave shape. The reflective surface 42 therefore has positive power. The reflective surface 42 is provided by externally forming a reflective coating on the lens 35. The second transmissive surface 43 has a convex shape protruding toward the magnifying side. The second transmissive surface 43 therefore has positive power. The first transmissive surface 41, the reflective surface 42, and the second transmissive surface 43 form a coaxial optical system having surfaces rotationally symmetric with respect to the imaginary axis M. Therefore, the imaginary axis M is the reference axis used in the design of the lens 35 and is the optical axis of the lens 35. In the present embodiment, the imaginary axis M coincides with the optical axis N of the first optical system 31. The imaginary axis M does not necessarily coincide with the optical axis N of the first optical system 31.

The upper and lower halves of the lens 35 are configured to be rotationally symmetric with respect to the imaginary axis M. That is, the first transmissive surface 41, the reflective surface 42, and the second transmissive surface 43 are so shaped that the cross-sectional shape in the plane YZ shown in FIG. 17 is rotated around the imaginary axis Mover the angular range of 90° toward one side and the other side of the axis-X direction. In the present embodiment, the first transmissive surface 41, the reflective surface 42, and the second transmissive surface 43 are each an aspheric surface.

The imaginary line P can be specified in the lens 35 of the second optical system 32, as shown in FIG. 17. The imaginary line P connects the upper intersection 53 to the lower intersection 54, the upper intersection 53 being an intersection where the upper peripheral light ray 51a of the upper-end light flux 51, where the upper-end light flux 51 is the light flux passing through the axis-Y-direction upper end of the effective range 50 of the second transmissive surface 43, and the upper peripheral light ray 52a of the lower-end light flux 52, where the lower-end light flux 52 is the light flux passing through the axis-Y-direction lower end of the effective range 50, intersect with each other in the plane YZ, and the lower intersection 54 being an intersection where the lower peripheral light ray 51b of the upper-end light flux 51 and the lower peripheral light ray 52b of the lower-end light flux 52 intersect with each other in the plane YZ. The imaginary line P inclines by 119.975° with respect to the imaginary vertical line V, which is perpendicular to the imaginary axis M in the plane YZ. In the present embodiment, the imaginary line P is located in the lens 35. Further, the imaginary line P is located at the upper side of the imaginary axis M.

The second intermediate image 34 is an inverted final image turned upside down. The second intermediate image 34 is an image so distorted that an oblong final image is projected on the screen S, which is the magnifying-side image formation plane. More specifically, the second intermediate image 34 has a shape so distorted as to correct trapezoidal distortion of the final image formed on the screen S. That is, the second intermediate image 34 has distortion opposite the trapezoidal distortion of the final image. The second intermediate image 34 is therefore so formed that the shortest edge thereof is the edge having the highest image height on the screen S.

Lens Data

Data on the lenses of the projection system 3B are as follows: The surfaces of the lenses are numbered sequentially from the demagnifying side toward the magnifying side. The surface number 1 represents the demagnifying-side surface of the cross dichroic prism 19, and the surface number 2 represents the magnifying-side surface thereof. The fields labeled with the surface number 20 show dummy data. The fields labeled with the surface numbers 33 and 35 show dummy data. The row of the reference characters represents the reference characters of the lenses thereof. The reference characters given in the second optical system 32 are the reference characters of the first transmissive surface 41, the reflective surface 42, and the second transmissive surface 43. That is, the surface number 34 represents the first transmissive surface 41 of the lens 35. The surface number 36 represents the reflective surface 42 of the lens 35. The surface number 38 represents the second transmissive surface 43 of the lens 35. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Reference character | r | d | nd | vd | Y | X |
| --- | --- | --- | --- | --- | --- | --- | --- |
| Object plane | | | 5.39 | | | | |
| 1 | | 0 | 25.91 | 1.516331 | 64.14 | 12.559 | 12.559 |
| 2 | | 0 | 4 | | | 15.586 | 15.586 |
| 3 | | 0 | 1.002399 | | | 16.302 | 16.302 |
| 4 | L1 | −133.57419 | 6.011318 | 1.834805 | 42.72 | 16.303 | 16.303 |
| 5 | | −30.06751 | 0.1 | | | 16.611 | 16.611 |
| 6 | L2 | 36.44276 | 9.5 | 1.680391 | 56.13 | 14.458 | 14.458 |
| 7 | | −97.08839 | 0.099996 | | | 13.079 | 13.079 |
| 8 | L3 | 19.03006 | 6.72612 | 1.500267 | 76.36 | 10.607 | 10.607 |
| 9 | L4 | −30.1881 | 4.856586 | 1.782717 | 27.46 | 9.376 | 9.376 |
| 10 | | 16.38333 | 3.364158 | | | 6.344 | 6.344 |
| Stop plane | | 0 | 1.133329 | | | 5.469 | 5.469 |
| 12 | L5 | −14.19822 | 7.30736 | 1.831787 | 25.31 | 5.55 | 5.55 |
| 13 | | −16.17662 | 11.10596 | | | 6.5 | 6.5 |
| 14 | L6 | 34.80767 | 12.286579 | 1.834805 | 42.72 | 14.828 | 14.828 |
| 15 | | 14500.02339 | 11.60282 | | | 14.912 | 14.912 |
| 16 | L7 | −24.80931 | 15 | 1.809486 | 24.69 | 15.03 | 15.03 |
| 17 | | 152.33291 | 9.876479 | | | 22.201 | 22.201 |
| 18 | L8 | −40.92498 | 15 | 1.834805 | 42.72 | 23.25 | 23.25 |
| 19 | | −26.94374 | 25 | | | 25.828 | 25.828 |
| 20 | dummy | 0 | 0 | | | 35.18 | 35.18 |
| 21 | L9 | 203.73525 | 27.648754 | 1.841506 | 43.26 | 35.853 | 35.853 |
| 22 | | −89.46446 | 25.734756 | | | 36.325 | 36.325 |
| 23 | L10 | 25.00096 | 20.786126 | 1.526667 | 71.48 | 20 | 20 |
| 24 | L11 | −26.8584 | 9.5 | 1.840401 | 30.99 | 17.832 | 17.832 |
| 25 | | 40.22741 | 23.246657 | | | 14.659 | 14.659 |

-continued

| Surface number | Reference character | r | d | nd | vd | Y | X |
|---|---|---|---|---|---|---|---|
| 26 | L12 | −112.38275 | 7.496778 | 1.804273 | 38.45 | 22.75 | 22.75 |
| 27 |  | −34.58485 | 0.099814 |  |  | 23.203 | 23.203 |
| 28 | L13 | −287.62622 | 3.807516 | 1.843957 | 23.85 | 25.203 | 25.203 |
| 29 | L14 | 63.92655 | 20 | 1.706879 | 54.62 | 27.123 | 27.123 |
| 30 |  | −75.2327 | 45.719344 |  |  | 29.05 | 29.05 |
| 31 | L15 | 42.148 | 19.249272 | 1.646579 | 51.98 | 37.638 | 37.638 |
| 32 |  | 113.79456 | 5 |  |  | 36.503 | 36.503 |
| 33 | dummy | 0 | 11.998186 |  |  | 37.216 | 37.216 |
| *34 | 41 | −94.96466 | 40 | 1.531132 | 55.75 | 28.51 | 28.51 |
| 35 | dummy | 0 | 0 | 1.531132 | 55.75 | 20.968 | 20.968 |
| *36 | 42 | −15.66358 | 0 | 1.531132 | 55.75 | 19.649 | 19.649 |
| 37 |  | 0 | −40 | 1.531132 | 55.75 | 57.99 | 57.99 |
| *38 | 43 | 70 | −210 |  |  | 41.018 | 41.018 |
| Image plane |  | 0 | 0 |  |  | 1449.682 | 1449.682 |

As shown in the lens data, the refractive index nd of the lens 35 is 1.531132, and the Abbe number vd of the lens 35 is 55.75. The field of the on-axis inter-surface distance d labeled with the surface number 38 shows the distance between the screen S and the second transmissive surface 43 of the lens 35. The field of the on-axis inter-surface distance d labeled with the surface number 38 therefore shows the projection distance f of the projection system 3B. In the present embodiment, f=210 mm. In the present embodiment, the effective radius of the reflective surface 42 is 19.649 mm in the axis-Y direction and 19.649 mm in the axis-X direction.

Aspheric data of the surface number 34 are as follows.

| | |
|---|---|
| Conic constant | 0 |
| Fourth-order coefficient | 2.251783E−05 |
| Sixth-order coefficient | −2.216254E−08 |
| Eighth-order coefficient | −3.699444E−13 |
| Tenth-order coefficient | 5.500327E−15 |

Aspheric data of the surface number 36 are as follows.

| | |
|---|---|
| Conic constant | −3.575909E+00 |
| Fourth-order coefficient | −1.663005E−05 |
| Sixth-order coefficient | 5.154425E−08 |
| Eighth-order coefficient | −5.434723E−11 |
| Tenth-order coefficient | 8.298117E−15 |

Aspheric data of the surface number 38 are as follows.

| | |
|---|---|
| Conic constant | 1.893316E+00 |
| Fourth-order coefficient | 4.868741E−07 |
| Sixth-order coefficient | 5.392946E−10 |
| Eighth-order coefficient | −4.104968E−13 |
| Tenth-order coefficient | 1.302551E−16 |

The present embodiment can also provide the same effects as those provided by the embodiment described above.

In the present embodiment, the inclination angle θ by which the imaginary line P inclines with respect to the imaginary vertical line V is 119.975°. The present embodiment therefore satisfies the conditional expressions (1) and (2) below. The projection apparatus 3B according to the present embodiment therefore allows suppression of the difference in the amount of light between the upper portion and the lower portion of the screen S.

$$0° < \theta < 90° + \gamma \quad (1)$$

$$90° < \theta \quad (2)$$

θ: Inclination angle over which an end of the imaginary line P facing the upper intersection 53 rotates counterclockwise relative to the imaginary vertical line V around the intersection of the imaginary vertical line V and the imaginary line P γ: angle from the imaginary axis M to the lower peripheral light ray 52b passing through the effective range 50 of the second transmissive surface 43 and intersects the imaginary axis M Further, the projection distance of the projection system 3B is f=210 mm. In the projection system 3B, the effective radius of the reflective surface 42 is 19.649 mm in the axis-X direction and 19.649 mm in the axis-Y direction. The projection system 3B according to the present embodiment therefore allows suppression of an increase in the size of the reflective surface 42 even in the case of a short projection distance.

Figure 18:
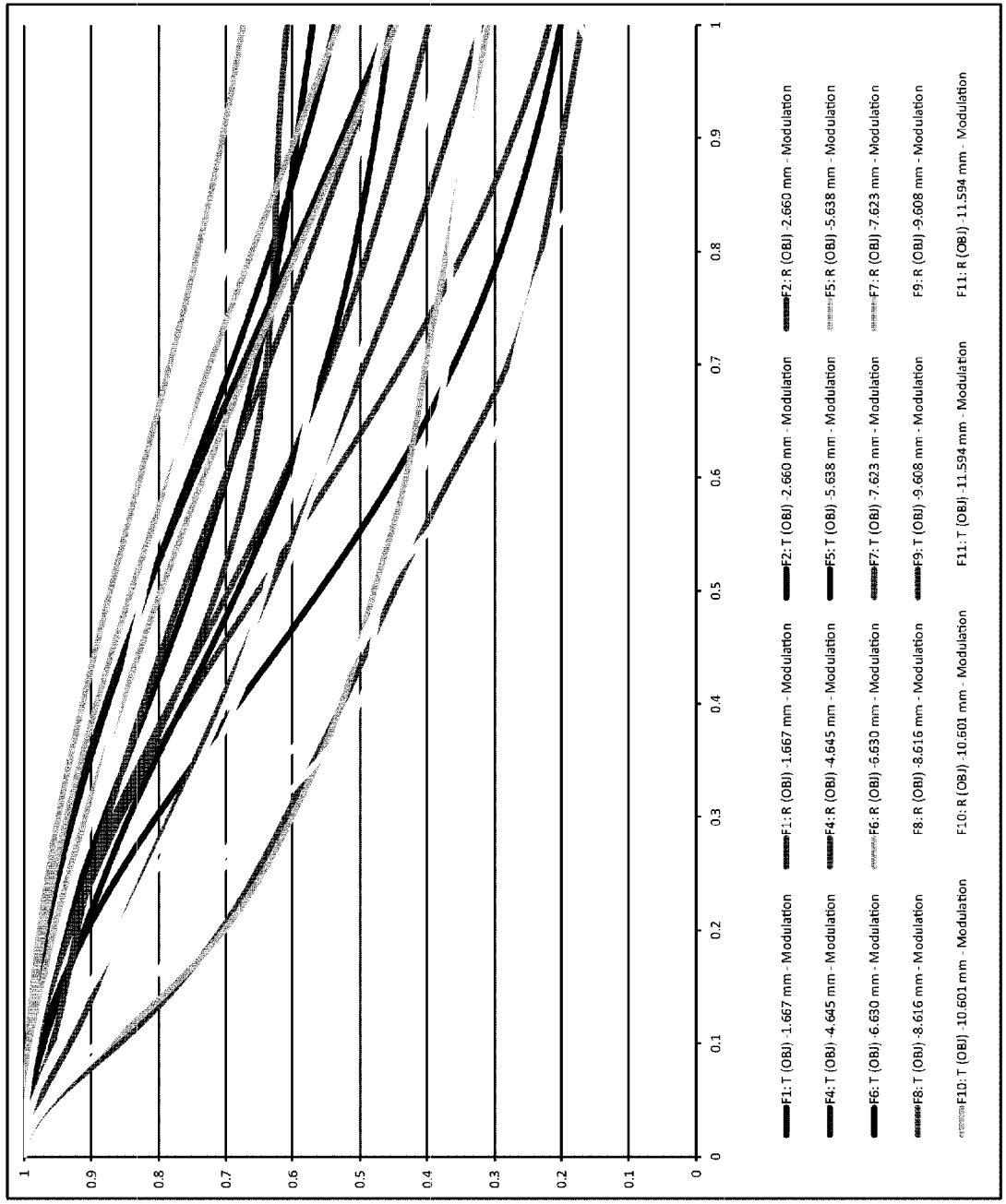
FIG. 18 shows an MTF of the projection system according to Embodiment 2 on the magnifying side.
Figure 19:
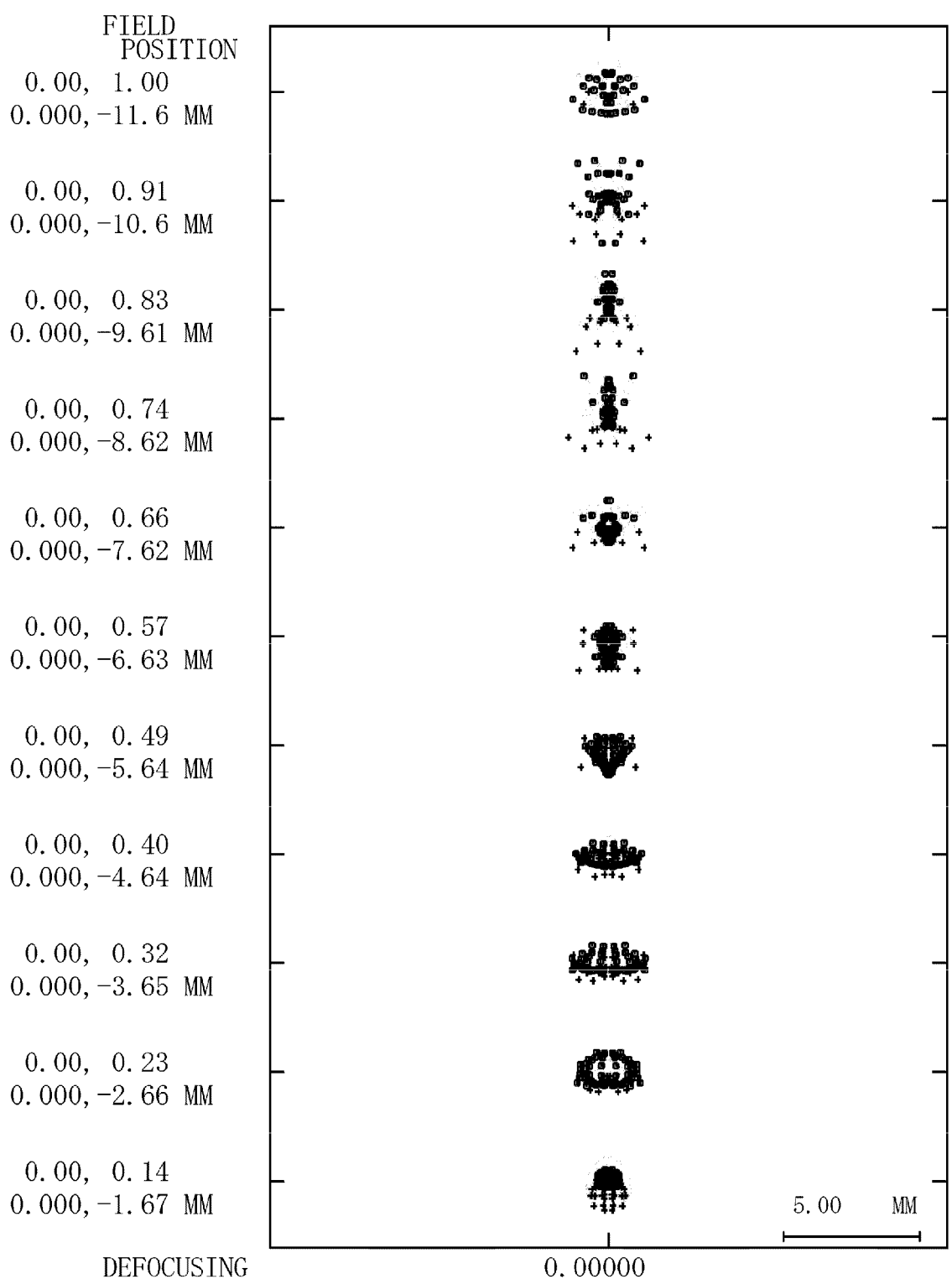
FIG. 19 is a spot diagram showing spots produced by the projection system according to Embodiment 2.

FIG. 18 shows an MTF of the projection system 3B on the magnifying side. The MTF was calculated under the following conditions: The image formation planes were divided along the axis Y; and the resultant halves were each divided into 11 areas. Light rays used in the calculation of the MTF are so weighted that the weighting ratio among the light rays having the wavelength of 620 nm, the light rays having the wavelength of 550 nm, and the light rays having the wavelength of 470 nm is 2:7:1. The horizontal axis of FIG. 18, which shows the MTF, represents the spatial frequency. The spatial frequency of 0.24 cycles corresponds to the resolution of 16.7 μm. The vertical axis of FIG. 18 represents the contrast reproduction ratio. In the present embodiment, a decrease in resolution is suppressed, as shown in FIG. 18. FIG. 19 is a spot diagram showing spots produced by the projection system 3B. In the present embodiment, variation in the size of the spots is suppressed, as shown in FIG. 19.

In the present embodiment, the lenses L1 to L15, which form the first optical system 31, are each a spherical lens but provide satisfactory optical characteristics. That is, in the present embodiment, aberrations produced by the projection system can be satisfactorily suppressed although the first optical system 31, which is a refractive optical system, has no aspheric lens.

Embodiment 3

Figure 20:
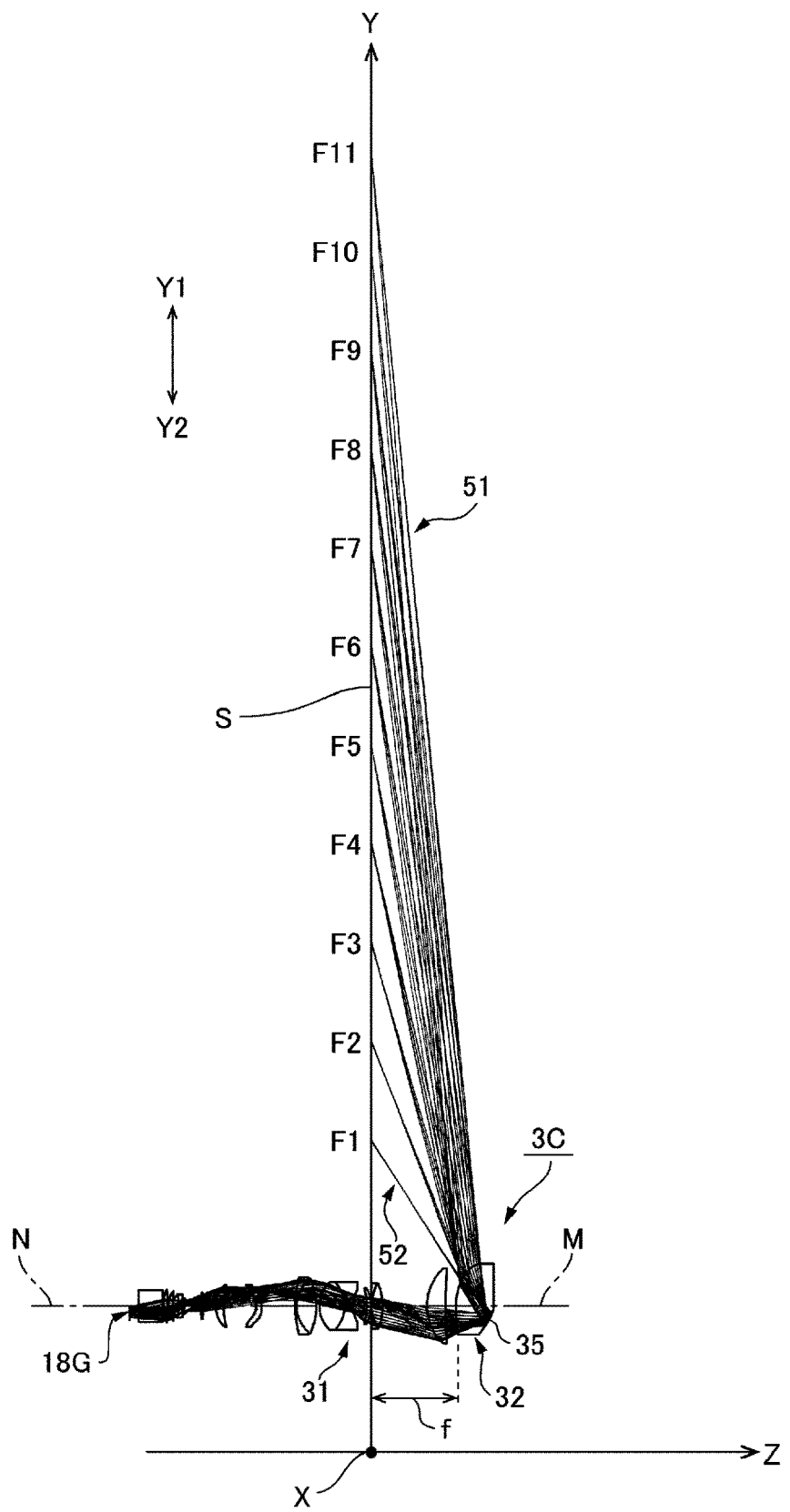
FIG. 20 is a light ray diagram of a projection system according to Embodiment 3.

FIG. 20 is a light ray diagram of a projection system according to Embodiment 3 of the present disclosure. FIG.

Figure 22:
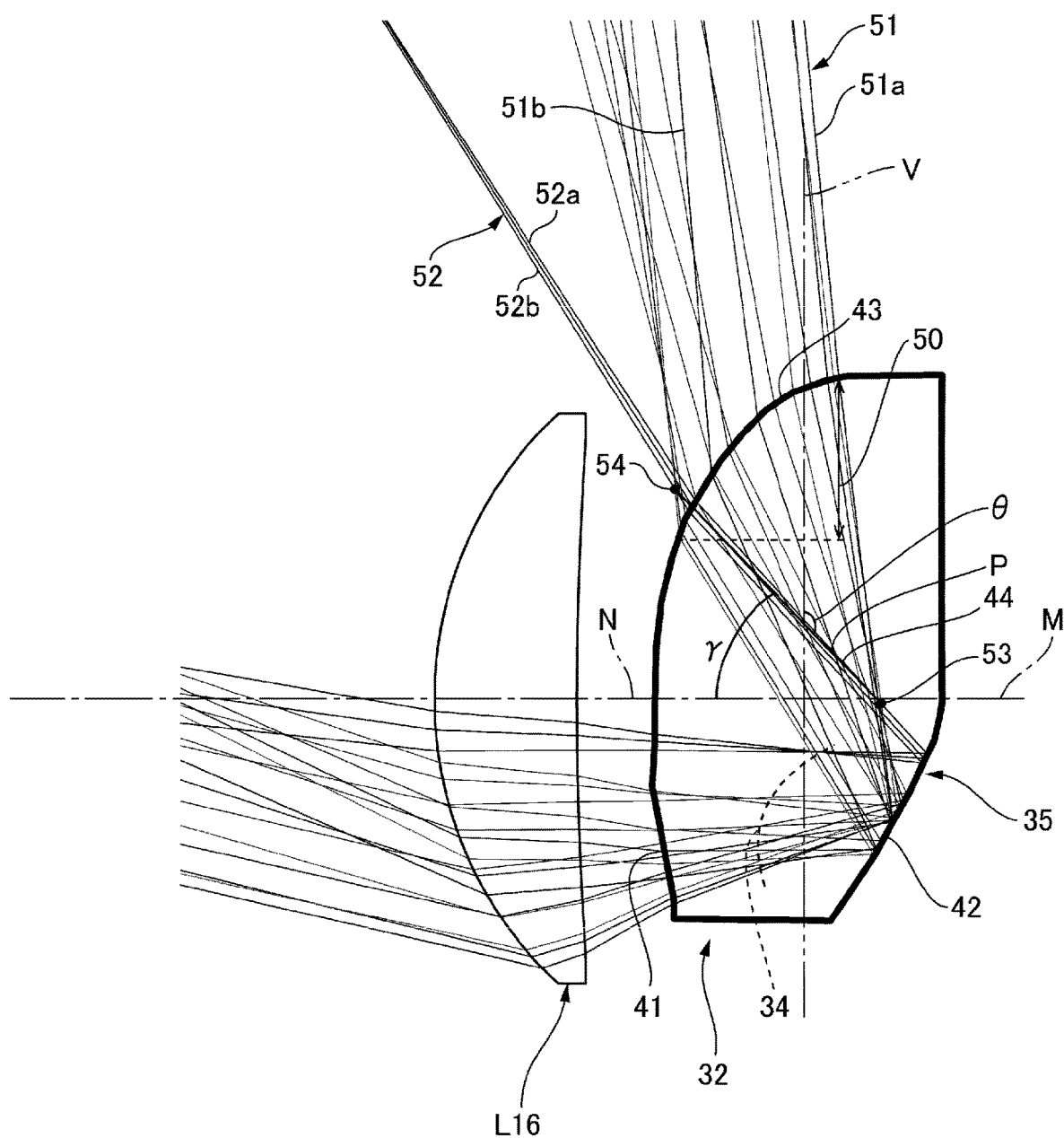
FIG. 22 is a light ray diagram with a portion including a second optical system of the projection system according to Embodiment 3 enlarged.

21 is a light ray diagram of the projection system according to Embodiment 3 enlarged. FIG. 22 is a light ray diagram with a portion including the second optical system 32 of the projection system according to Embodiment 3 enlarged. FIG. 20 diagrammatically shows the 11 light fluxes F1 to F11, which exit out of a projection system 3C and reach the screen S. The light flux F1 is a light flux that reaches the lowest image height position. The light flux F11 is a light flux that reaches the highest image height position. The light fluxes F2 to F10 are light fluxes that reach height positions between the height position that the light flux F1 reaches and the height position that the light flux F11 reaches. The projection system 3C according to the present embodiment has a configuration corresponding to the projection system 3A in the embodiment described above, and the corresponding components therefore have the same reference characters in the following description.

Figure 21:
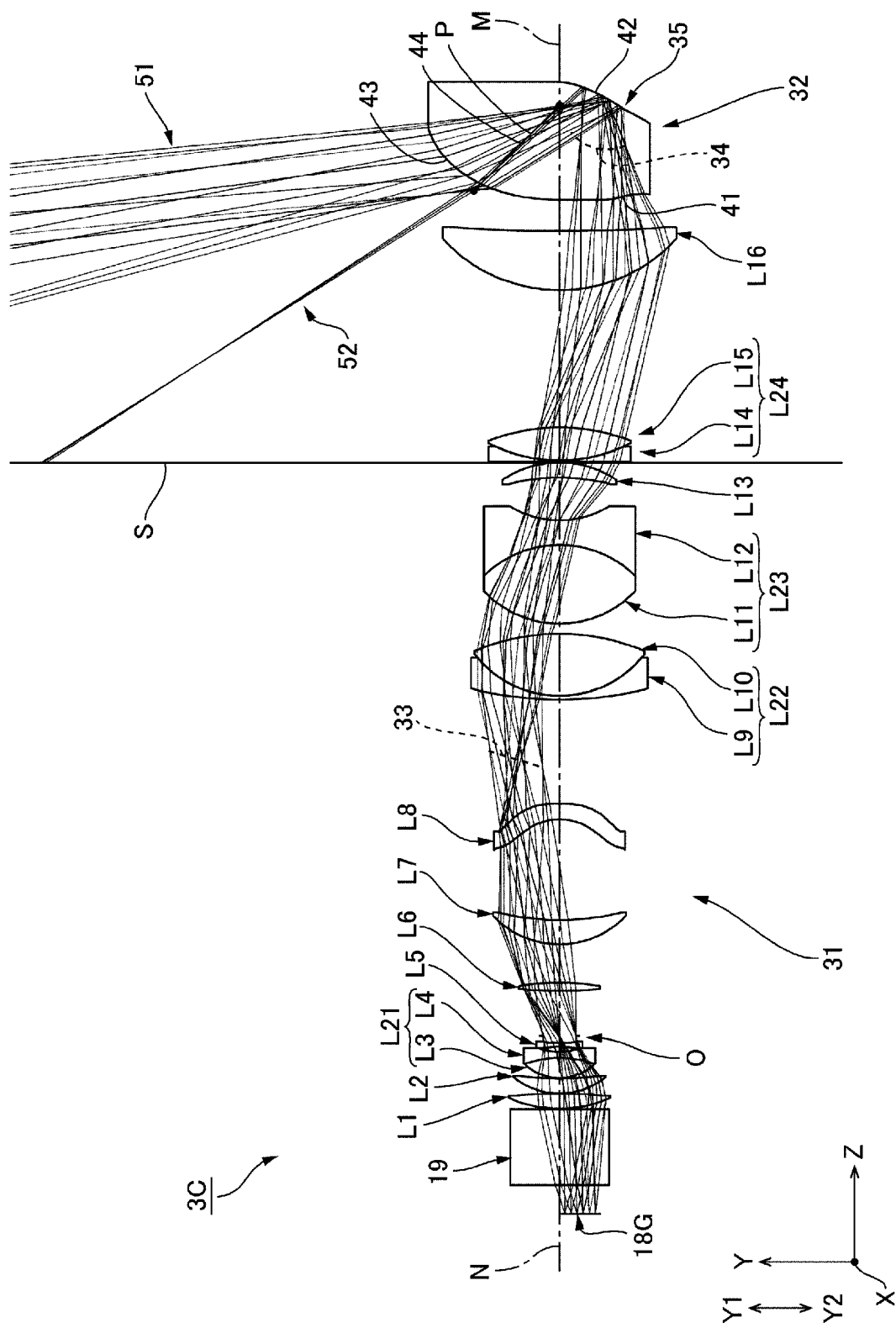
FIG. 21 is a light ray diagram of the projection system according to Embodiment 3 enlarged.

The projection system 3C according to the present embodiment is formed of the first optical system 31 and the second optical system 32 sequentially arranged from the demagnifying side toward the magnifying side, as shown in FIG. 20. The projection system 3C forms the first intermediate image 33 and the second intermediate image 34 in positions between the demagnifying-side image formation plane and the magnifying-side image formation plane of the projection system 3C, as shown in FIG. 21.

The first optical system 31 is a refractive optical system including a plurality of lenses. The second optical system 32 is the lens 35. The liquid crystal panels 18R, 18G, and 18B of the image formation section 2 are disposed in the demagnifying-side image formation plane. FIGS. 20 and 21 show the liquid crystal panel 18G, which is one of the three liquid crystal panels 18R, 18G, and 18B.

The first intermediate image 33 is located at the demagnifying side of the second intermediate image 34. The first intermediate image 33 is formed in the first optical system 31. The second intermediate image 34 is formed in the second optical system 32, that is, the lens 35.

The liquid crystal panels 18R, 18G, and 18B form projection images on one side of the optical axis N of the first optical system 31 in the demagnifying-side image formation plane. The first intermediate image 33 is located at the other side of the optical axis N of the first optical system 31. The second intermediate image 34 is located at the one side of the optical axis N of the first optical system 31. That is, the projection images and the second intermediate image 34 are located at the one side of the optical axis N, and the first intermediate image 33 is located at the side opposite the projection images and the second intermediate image 34 with respect to the optical axis N.

The screen S is disposed in the magnifying-side image formation plane. A final image projected on the screen S has an oblong shape elongated in the lateral direction. In the present embodiment, the final image has an aspect ratio of 16:10.

The first optical system 31 includes the cross dichroic prism 19 and 16 lenses L1 to L16, as shown in FIG. 21. The first lens L1 to the sixteenth lens L16 are arranged in the presented order from the demagnifying side toward the magnifying side. In the present embodiment, the third lens L3 and the fourth lens L4 are bonded to each other to form the first doublet L21. The ninth lens L9 and the tenth lens L10 are bonded to each other to form the second doublet L22. The eleventh lens L11 and the twelfth lens L12 are bonded to each other to form the third doublet L23. The fourteenth lens L14 and the fifteenth lens L15 are bonded to each other to form the fourth doublet L24. The stop O is disposed between the fifth lens L5 and the sixth lens L6. In the present embodiment, the fifth lens L5 and the eighth lens L8 are two lenses that are each an aspheric lens having aspheric surfaces on both surfaces.

In the first optical system 31, the sixteenth lens L16, which is located in a position closest to the magnifying side, has positive power. Since the sixteenth lens L16 has positive power in the first optical system 31, the principal rays between the first optical system 31 and the second optical system. 32 approach each other toward the second optical system 32.

The lens 35, which forms the second optical system 32, is made of resin. The lens 35 has the first transmissive surface 41, the reflective surface 42, and the second transmissive surface 43 sequentially arranged from the demagnifying side toward the magnifying side, as shown in FIG. 22. In the case where the lens 35 is made of resin, the lens 35 can be manufactured in injection molding. A lens 35 having a complicated shape is therefore readily manufactured.

Also in the following description of the present embodiment, three axes perpendicular to one another are called the axes X, Y, and Z for convenience. A first direction in which the first transmissive surface 41 and the reflective surface 42 are arranged is called the axis-Z direction. A second direction, which is called an axis-y direction, coincides with the vertical direction of the screen S. One side of the axis Y is called the upper side Y1, and the other side of the axis Y is called the lower side Y2. A first plane perpendicular to the axis X and containing the axes Y and Z is called the plane YZ. FIGS. 20 to 22 therefore each show the plane YZ. The optical axis N of the first optical system 31 extends in the axis-Z direction. The image formation section 2 forms a projection image on the upper side Y1 of the optical axis N of the first optical system 31. The second intermediate image 34 is formed on the lower side Y2 of the optical axis N of the first optical system 31. The lateral direction of the screen S coincides with a third direction, which is called the axis-X direction. In the following description, the imaginary axis M extending in the axis-Z direction is set in the plane YZ. The imaginary axis M is the reference axis used in the design of the lens 35. The imaginary axis M is perpendicular to the screen S, which is the magnifying-side image formation plane. The imaginary axis M is substantially perpendicular to the screen S in some cases.

The first transmissive surface 41 and the reflective surface 42 are located at the lower side Y2 of the imaginary axis M. The second transmissive surface 43 is located at the upper side Y1 of the imaginary axis M. The reflective surface 42 has a concave shape. The reflective surface 42 therefore has positive power. The reflective surface 42 is provided by externally forming a reflective coating on the lens 35. The second transmissive surface 43 has a convex shape protruding toward the magnifying side. The second transmissive surface 43 therefore has positive power. The first transmissive surface 41, the reflective surface 42, and the second transmissive surface 43 form a coaxial optical system having surfaces rotationally symmetric with respect to the imaginary axis M. Therefore, the imaginary axis M is the reference axis used in the design of the lens 35 and is the optical axis of the lens 35. In the present embodiment, the imaginary axis M coincides with the optical axis N of the first optical system 31. The imaginary axis M does not necessarily coincide with the optical axis N of the first optical system 31.

The upper and lower halves of the lens 35 are configured to be rotationally symmetric with respect to the imaginary axis M. That is, the first transmissive surface 41, the reflective surface 42, and the second transmissive surface 43 are so shaped that the cross-sectional shape in the plane YZ shown in FIG. 22 is rotated around the imaginary axis M over the angular range of 90° toward one side and the other side of the axis-X direction. In the present embodiment, the first transmissive surface 41, the reflective surface 42, and the second transmissive surface 43 are each an aspheric surface.

The imaginary line P can be specified in the lens 35 of the second optical system 32, as shown in FIG. 22. The imaginary line P connects the upper intersection 53 to the lower intersection 54, the upper intersection 53 being an intersection where the upper peripheral light ray 51a of the upper-end light flux 51, where the upper-end light flux 51 is the light flux passing through the axis-Y-direction upper end of the effective range 50 of the second transmissive surface 43, and the upper peripheral light ray 52a of the lower-end light flux 52, where the lower-end light flux 52 is the light flux passing through the axis-Y-direction lower end of the effective range 50, intersect with each other in the plane YZ, and the lower intersection 54 being an intersection where the lower peripheral light ray 51b of the upper-end light flux 51 and the lower peripheral light ray 52b of the lower-end light flux 52 intersect with each other in the plane YZ. The imaginary line P inclines by 134.178° with respect to the imaginary vertical line V, which is perpendicular to the imaginary axis M in the plane YZ. In the present embodiment, the imaginary line P is located at the upper side of the imaginary axis M. Further, part of the imaginary line P protrudes beyond the second transmissive surface 43 toward the magnifying side.

The second intermediate image 34 is an inverted final image turned upside down. The second intermediate image 34 is an image so distorted that an oblong final image is projected on the screen S, which is the magnifying-side image formation plane. More specifically, the second intermediate image 34 has a shape so distorted as to correct trapezoidal distortion of the final image formed on the screen S. That is, the second intermediate image 34 has distortion opposite the trapezoidal distortion of the final image. The second intermediate image 34 is therefore so formed that the shortest edge thereof is the edge having the highest image height on the screen S.

Lens Data

Data on the lenses of the projection system 3C are as follows: The surfaces of the lenses are numbered sequentially from the demagnifying side toward the magnifying side. The surface number 1 represents the demagnifying-side surface of the cross dichroic prism 19, and the surface number 2 represents the magnifying-side surface thereof. The fields labeled with the surface number 10 show dummy data. The fields labeled with the surface numbers 33 and 35 show dummy data. The row of the reference characters represents the reference characters of the lenses thereof. The reference characters given in the second optical system 32 are the reference characters of the first transmissive surface 41, the reflective surface 42, and the second transmissive surface 43. That is, the surface number 34 represents the first transmissive surface 41 of the lens 35. The surface number 36 represents the reflective surface 42 of the lens 35. The surface number 38 represents the second transmissive surface 43 of the lens 35. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Reference character | r | d | nd | vd | Y | X |
|---|---|---|---|---|---|---|---|
| Object plane | | 0 | 7.125 | | | | |
| 1 | | 0 | 19.4325 | 1.516331 | 64.14 | 9.514 | 9.514 |
| 2 | | 0 | 0.1 | | | 10.984 | 10.984 |
| 3 | L1 | 28.42256 | 3.78432 | 1.757915 | 51.85 | 11.264 | 11.264 |
| 4 | | -142.48729 | 0.1 | | | 11.158 | 11.158 |
| 5 | L2 | 16.93188 | 3.814207 | 1.755086 | 52.31 | 10.197 | 10.197 |
| 6 | | 79.29902 | 0.1 | | | 9.766 | 9.766 |
| 7 | L3 | 11.83622 | 5.103522 | 1.616264 | 60.78 | 7.902 | 7.902 |
| 8 | L4 | -23.99085 | 1.581227 | 1.839976 | 31.65 | 7.103 | 7.103 |
| 9 | | 14.6211 | 0.922137 | | | 5.101 | 5.101 |
| 10 | dummy | 0 | 0.38083 | | | 5.098 | 5.098 |
| *11 | L5 | -11.31193 | 0.92324 | 1.735262 | 29.09 | 5.095 | 5.095 |
| *12 | | -63.14602 | 1.633016 | | | 4.438 | 4.438 |
| Stop plane | | 0 | 11.5 | | | 4 | 4 |
| 14 | L6 | 83.6337 | 2.127237 | 1.836759 | 36.16 | 8.6 | 8.6 |
| 15 | | -57.6326 | 9.77539 | | | 8.865 | 8.865 |
| 16 | L7 | 21.28731 | 6.165121 | 1.437002 | 95.1 | 14.875 | 14.875 |
| 17 | | 58.19584 | 25.656516 | | | 14.683 | 14.683 |
| *18 | L8 | -13.51452 | 4 | 1.531132 | 55.75 | 14.253 | 14.253 |
| *19 | | -34.99865 | 26.464857 | | | 14.629 | 14.629 |
| 20 | L9 | 82.66112 | 1 | 1.838294 | 34.55 | 20 | 20 |
| 21 | L10 | 25 | 15.773393 | 1.738395 | 49.99 | 19.736 | 19.736 |
| 22 | | -50.13211 | 2.619612 | | | 19.878 | 19.878 |
| 23 | L11 | 24.25995 | 19.999917 | 1.702751 | 54.84 | 17.011 | 17.011 |
| 24 | L2 | -25 | 6.307562 | 1.840347 | 31.07 | 12.232 | 12.232 |
| 25 | | 21.989 | 10.845839 | | | 12 | 12 |
| 26 | L13 | -47.34828 | 3.835205 | 1.707357 | 54.6 | 11.811 | 11.811 |
| 27 | | -23.78136 | 0.1 | | | 12.696 | 12.696 |
| 28 | L14 | 1339.1208 | 0.4 | 1.845747 | 24.61 | 14.5 | 14.5 |
| 29 | L15 | 35 | 8.429353 | 1.742186 | 52.89 | 15.392 | 15.392 |
| 30 | | -45.12423 | 35 | | | 15.946 | 15.946 |
| 31 | L16 | 36.86057 | 15 | 1.77005 | 50.02 | 26.619 | 26.619 |
| 32 | | 348.7782 | 3 | | | 25.185 | 25.185 |
| 33 | dummy | 0 | 5 | | | 24.057 | 24.057 |
| *34 | 41 | -101.57313 | 30 | 1.531132 | 55.75 | 20.488 | 20.488 |

-continued

| Surface number | Reference character | r | d | nd | vd | Y | X |
|---|---|---|---|---|---|---|---|
| 35 | dummy | 0 | 0 | 1.531132 | 55.75 | 15.071 | 15.071 |
| *36 | 42 | −10.38282 | 0 | 1.531132 | 55.75 | 15.358 | 15.358 |
| 37 | | 0 | −30 | 1.531132 | 55.75 | 49.116 | 49.116 |
| *38 | 43 | 51.41376 | −67 | | | 31.631 | 31.631 |
| Image plane | | 0 | 0 | | | 869.797 | 869.797 |

As shown in the lens data, the refractive index nd of the lens 35 is 1.531132, and the Abbe number vd of the lens 35 is 55.75. The field of the on-axis inter-surface distance d labeled with the surface number 38 shows the distance between the screen S and the second transmissive surface 43 of the lens 35. The field of the on-axis inter-surface distance d labeled with the surface number 38 therefore shows the projection distance f of the projection system 3C. In the present embodiment, f=67 mm.

Aspheric data of the surface number 11 are as follows.

| Conic constant | 0 |
|---|---|
| Fourth-order coefficient | 2.223201E−03 |
| Sixth-order coefficient | −6.855458E−05 |
| Eighth-order coefficient | 1.706402E−06 |
| Tenth-order coefficient | −2.144931E−08 |
| Twelfth-order coefficient | 4.86801E−11 |

Aspheric data of the surface number 12 are as follows.

| Conic constant | −9.577E+01 |
|---|---|
| Fourth-order coefficient | 2.2252E−03 |
| Sixth-order coefficient | −5.537226E−05 |
| Eighth-order coefficient | 1.791869E−06 |
| Tenth-order coefficient | −1.106534E−07 |
| Twelfth-order coefficient | 6.173103E−09 |
| Fourteenth-order coefficient | −1.335827E−10 |

Aspheric data of the surface number 18 are as follows.

| Conic constant | −3.124817E−01 |
|---|---|
| Fourth-order coefficient | −1.154354E−04 |
| Sixth-order coefficient | 9.235588E−07 |
| Eighth-order coefficient | 3.549555E−10 |
| Tenth-order coefficient | −1.588502E−12 |

Aspheric data of the surface number 19 are as follows.

| Conic constant | −2.941305E+01 |
|---|---|
| Fourth-order coefficient | −2.289301E−04 |
| Sixth-order coefficient | 6.335789E−07 |
| Eighth-order coefficient | −1.717088E−09 |
| Tenth-order coefficient | 5.715362E−12 |

Aspheric data of the surface number 34 are as follows.

| Conic constant | 0 |
|---|---|
| Fourth-order coefficient | 5.180723E−05 |
| Sixth-order coefficient | −7.662103E−08 |
| Eighth-order coefficient | −1.965298E−11 |
| Tenth-order coefficient | 6.539092E−14 |

Aspheric data of the surface number 36 are as follows.

| Conic constant | −2.849817E+00 |
|---|---|
| Fourth-order coefficient | −1.229302E−05 |
| Sixth-order coefficient | 7.336686E−08 |
| Eighth-order coefficient | −4.480571E−11 |
| Tenth-order coefficient | 3.631135E−14 |

Aspheric data of the surface number 38 are as follows.

| Conic constant | 1.606649E+00 |
|---|---|
| Fourth-order coefficient | 2.197984E−06 |
| Sixth-order coefficient | 1.939805E−10 |
| Eighth-order coefficient | −1.56594E−12 |
| Tenth-order coefficient | 1.324734E−15 |

The present embodiment can also provide the same effects as those provided by the embodiments described above.

In the present embodiment, the inclination angle θ by which the imaginary line P inclines with respect to the imaginary vertical line V is 134.178°. The present embodiment therefore satisfies the conditional expressions (1) and (2) below. The projection apparatus 3C according to the present embodiment therefore allows suppression of the difference in the amount of light between the upper portion and the lower portion of the screen S.

$$0° < \theta < 90° + \gamma \quad (1)$$

$$90° < \theta \quad (2)$$

θ: Inclination angle over which an end of the imaginary line P facing the upper intersection 53 rotates counterclockwise relative to the imaginary vertical line V around the intersection of the imaginary vertical line V and the imaginary line P γ: angle from the imaginary axis M to the lower peripheral light ray 52b passing through the effective range 50 of the second transmissive surface 43 and intersects the imaginary axis M Further, the projection distance of the projection system 3C is f=67 mm. In the projection system 3B, the effective radius of the reflective surface 42 is 15.358 mm in the axis-X direction and 15.358 mm in the axis-Y direction. The projection system 3C according to the present embodiment therefore allows suppression of an increase in the size of the reflective surface 42 even in the case of a short projection distance.

Figure 23:
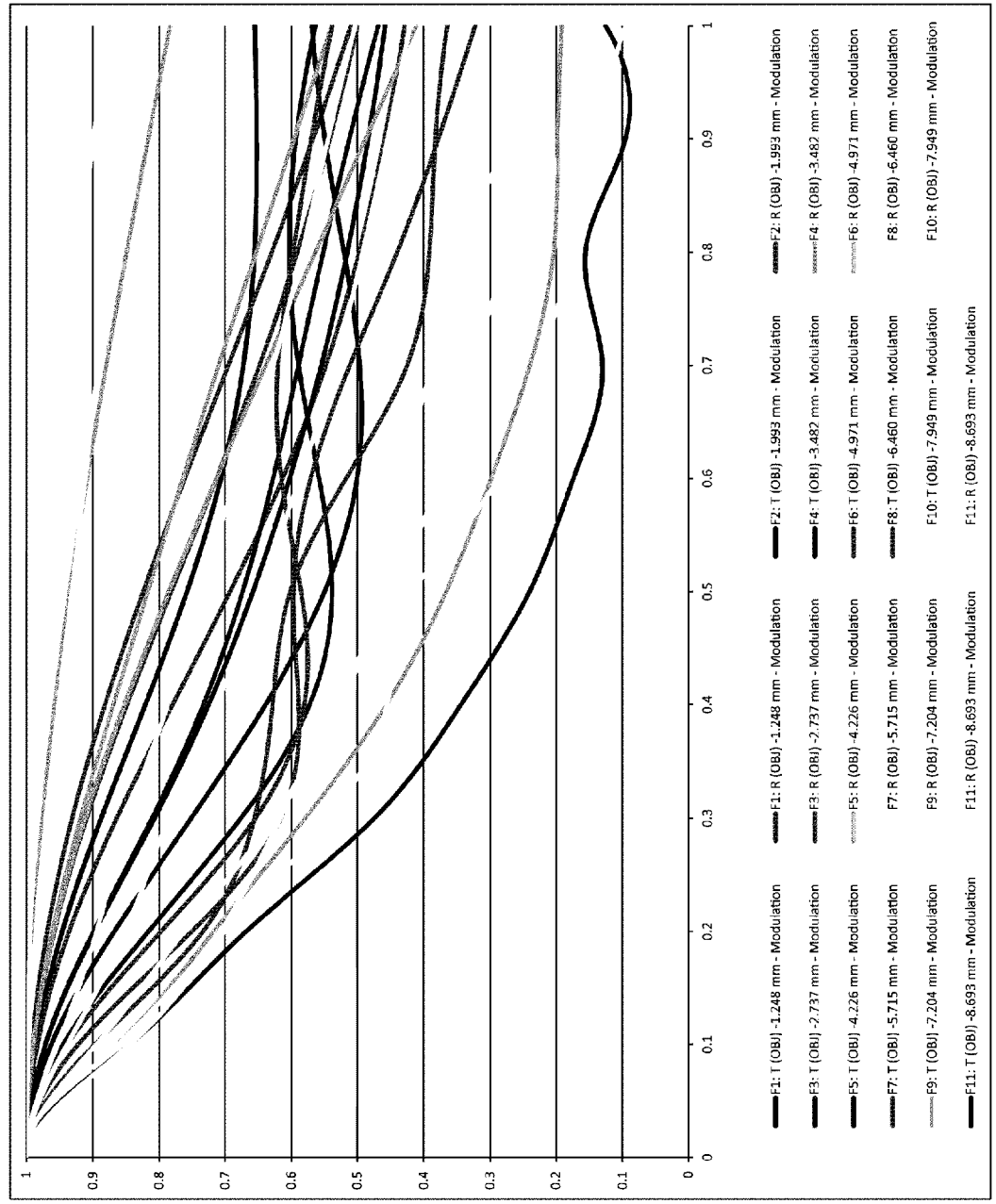
FIG. 23 shows an MTF of the projection system according to Embodiment 3 on the magnifying side.
Figure 24:
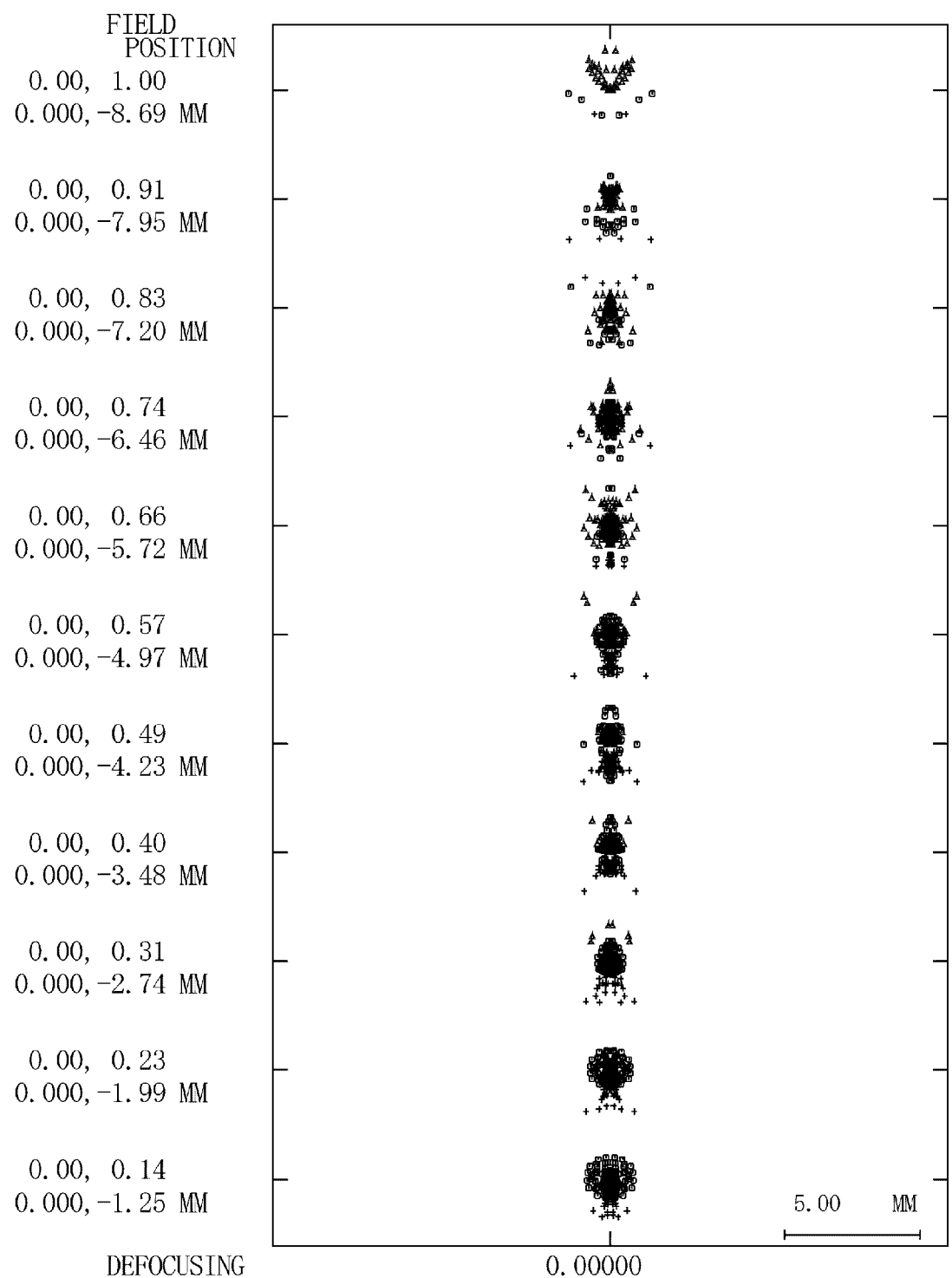
FIG. 24 is a spot diagram showing spots produced by the projection system according to Embodiment 3.

FIG. 23 shows an MTF of the projection system on the magnifying side. The MTF was calculated under the following conditions: The image formation planes were divided along the axis Y; and the resultant halves were each divided into 11 areas. Light rays used in the calculation of the MTF are so weighted that the weighting ratio among the light rays having the wavelength of 620 nm, the light rays having the wavelength of 550 nm, and the light rays having the wavelength of 470 nm is 2:7:1. The horizontal axis of FIG. 23, which shows the MTF, represents the spatial frequency. The spatial frequency of 0.3 cycles corresponds to the resolution of 16.7 µm. The vertical axis of FIG. 23 represents the contrast reproduction ratio. In the present embodiment, a decrease in resolution is suppressed, as shown in FIG. 23. FIG. 24 is a spot diagram showing spots produced by the projection system 3C. In the present embodiment, variation in the size of the spots is suppressed, as shown in FIG. 24.

Variation of Embodiment 3

Figure 25:
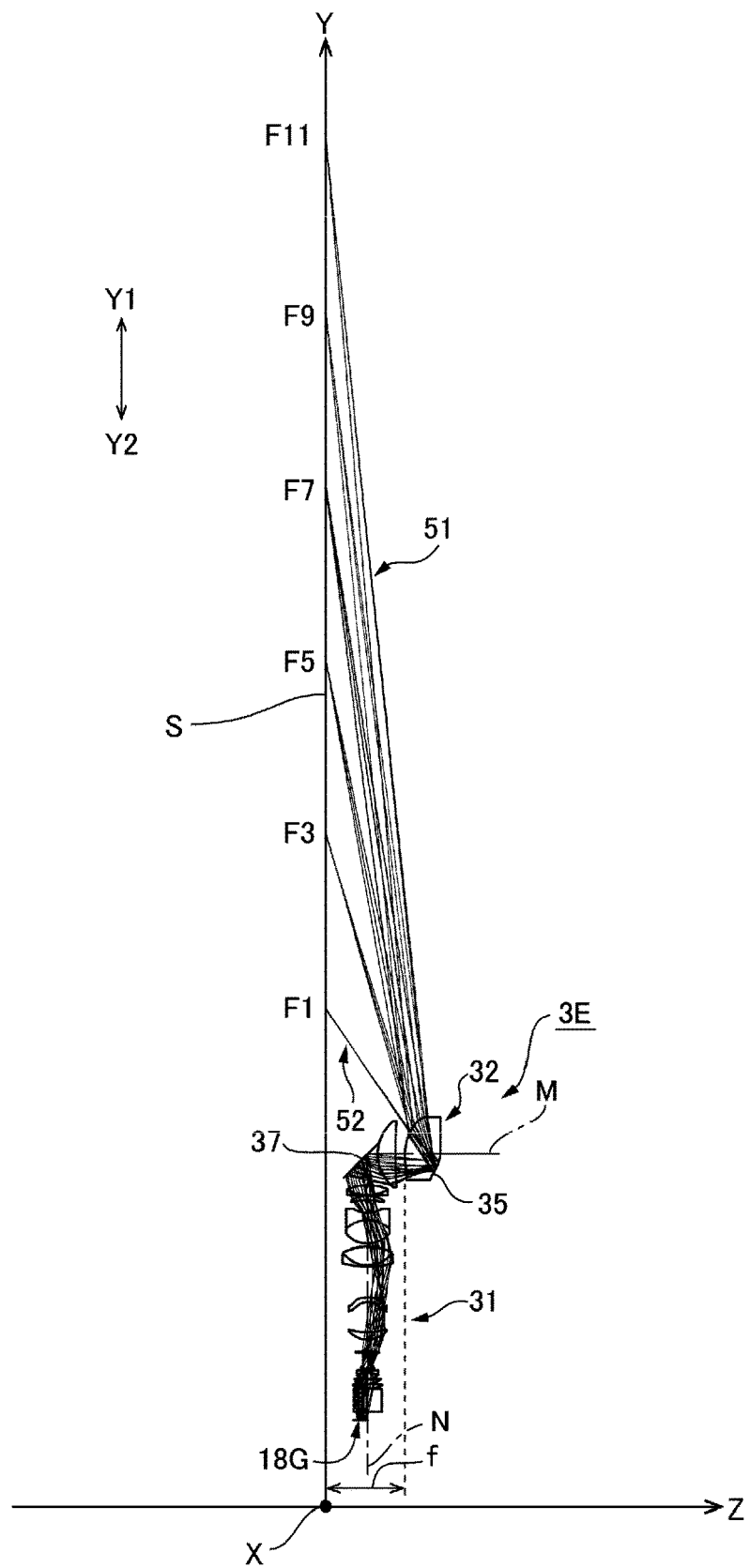
FIG. 25 is a light ray diagram of a projection system according to a variation of Embodiment 3.
Figure 26:
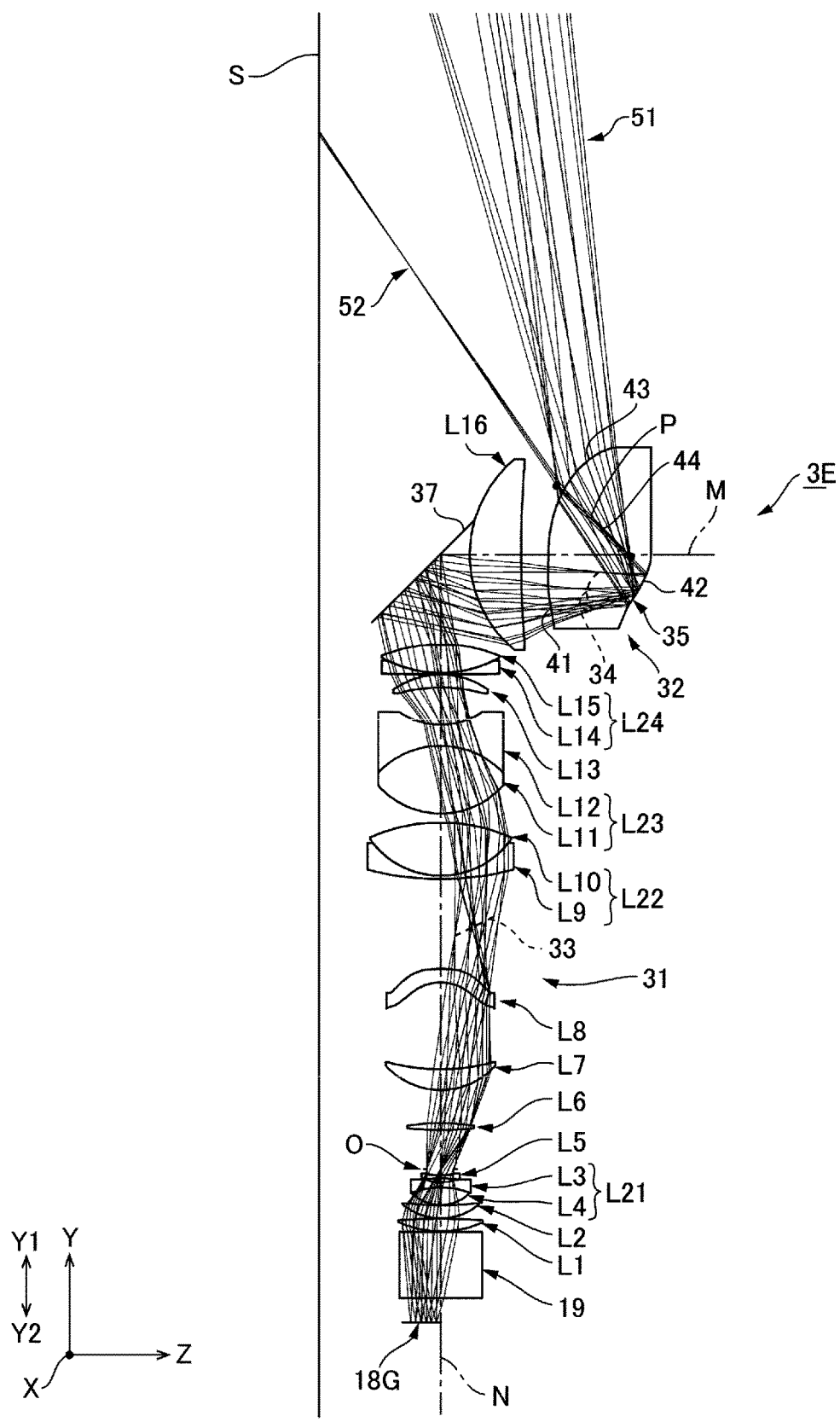
FIG. 26 is a light ray diagram of the projection system according to the variation of Embodiment 3 enlarged.

FIG. 25 is a light ray diagram of a projection system according to a variation of Embodiment 3. FIG. 26 is a light ray diagram of the projection system according to the variation of Embodiment 3 enlarged. In the projection system 3E according to the variation shown in FIG. 25, a reflection mirror 37 is disposed in the first optical system 31 and deflects the optical axis N of the first optical system 31. The reflective surface of the reflection mirror 37 is a flat surface. The reflection mirror 37 is disposed between two lenses separate from each other by the longest on-axis inter-surface distance out of the plurality of lenses that form the first optical system 31. In the present embodiment, the reflection mirror 37 is disposed between the fifteenth lens L15 and the sixteenth lens L16. The thus configured projection system 3E has a compact configuration in the direction along the imaginary axis M of the second optical system 32, that is, in the axis-Z direction.

Other Embodiments

In Embodiments 1 to 3 described above, the lens 35 is made of resin. The lens 35 can instead be made of glass. In the case where the lens 35 is made of glass, the lens 35 can be processed with high precision as compared with the case where the lens 35 is made of resin. Further, in the case where the lens 35 is made of glass, the amount of expansion of the lens 35 can be suppressed when the temperature of the lens 35 rises due to internal absorption of light, as compared with the case where the lens 35 is made of resin. The lens 35 made of glass can therefore maintain the optical performance of the lens and improve the reliability thereof even in the case where the high luminance light is incident to the lens 35.

A configuration in which at least one of the first transmissive surface 41, the reflective surface 42, and the second transmissive surface 43 of the lens 35 is an aspheric surface allows suppression of aberrations that affect a final image projected on the screen S.

In the embodiments described above, the inclination angle θ, by which the imaginary line P inclines with respect to the imaginary vertical line V, satisfies the conditional expressions (1) and (2). Instead, a configuration in which the inclination angle θ satisfies at least the conditional expression (1) can avoid the situation in which the amount of light at the upper periphery of the screen S is smaller than the amount of light at the lower periphery of the screen S.

Further, in Embodiments 1 to 3 described above, the lens 35 may be provided with a light shield. In this case, the light shield blocks light rays that incline with respect to the imaginary line P and do not fall within the effective range through which the imaginary line P passes. Stray light produced in the lens 35 can thus be avoided.

Also in the projection system 3A according to Embodiment 1 and the projection system 3B according to Embodiment 2, the reflection mirror 37 may be disposed in the first optical system 31 and deflect the optical axis N of the first optical system 31, as in the projection system 3E according to the variation of Embodiment 3. In this case, the reflection mirror 37 is disposed between two lenses separate from each other by the longest on-axis inter-surface distance out of the lenses that form the first optical system 31.

Further, any of the first transmissive surface 41, the reflective surface 42, and the second transmissive surface 43 of the lens 35 can be formed of a free-form surface. The projection distance of the projection system can thus be further shortened.

What is claimed is:

1. A projection system comprising a first optical system and a second optical system sequentially arranged from a demagnifying side toward a magnifying side, the projection system forming a first intermediate image and a second intermediate image in positions between a demagnifying-side image formation plane and a magnifying-side image formation plane of the projection system,
   wherein the second optical system is a lens,
   the lens has a first transmissive surface, a reflective surface, and a second transmissive surface sequentially arranged from the demagnifying side toward the magnifying side,
   three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z,
   the first transmissive surface and the reflective surface are located at the lower side of an imaginary axis extending in the axis-Z direction,
   the second transmissive surface is located at the upper side of the imaginary axis,
   the reflective surface has a concave shape,
   the second transmissive surface has a convex shape protruding toward the magnifying side,
   an imaginary line that connects an upper intersection to a lower intersection inclines with respect to an imaginary vertical line perpendicular to the imaginary axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ,
   the lens is asymmetrical about the imaginary vertical line,
   the first intermediate image is located in the first optical system, and
   the second intermediate image is located in the lens between the first transmissive surface and the reflective surface.

2. The projection system according to claim 1, wherein the first optical system is a refractive optical system.

3. The projection system according to claim 2, wherein the imaginary axis coincides with an optical axis of the first optical system.

4. The projection system according to claim 1, wherein principal rays between the first optical system and the second optical system approach each other toward the second optical system.

5. The projection system according to claim 1, wherein any of the first transmissive surface, the reflective surface, and the second transmissive surface is an aspheric surface.

6. The projection system according to claim 5, wherein the first transmissive surface is an aspheric surface.

7. The projection system according to claim 1, wherein the second intermediate image has a shape so distorted as to correct trapezoidal distortion of a final image formed in the magnifying-side image formation plane.

8. The projection system according to claim 1,
wherein the first transmissive surface, the reflective surface, and the second transmissive surface form a coaxial optical system having surfaces rotationally symmetric with respect to the imaginary axis, and
the imaginary axis is a design reference axis.

9. The projection system according to claim 1, wherein the projection system satisfies a conditional expression below, $$0°<\theta<90°+\gamma \quad (1)$$

where θ is an inclination angle over which an end of the imaginary line facing the upper intersection rotates counterclockwise relative to the imaginary vertical line around an intersection of the imaginary vertical line and the imaginary line, and γ is an angle from the imaginary axis to the lower peripheral light ray of the lower-end light flux and intersects the imaginary axis.

10. The projection system according to claim 9, wherein the projection system satisfies a conditional expression (2) below, $$90°\theta< \quad (2).$$

11. A projection-type image display apparatus comprising:
the projection system according to claim 1; and
a display that displays a projection image in the demagnifying-side image formation plane.

12. The projection-type image display apparatus according to claim 11,
wherein the display forms the projection image at one side of an optical axis of the first optical system,
the first intermediate image is located at a side opposite the projection image with respect to the optical axis, and
the second intermediate image is located at the lower side of the imaginary axis.

13. A projection-type image display apparatus comprising:
the projection system according to claim 2; and
a display that displays a projection image in the demagnifying-side image formation plane.

14. A projection-type image display apparatus comprising:
the projection system according to claim 3; and
a display that displays a projection image in the demagnifying-side image formation plane.

15. A projection-type image display apparatus comprising:
the projection system according to claim 4; and
a display that displays a projection image in the demagnifying-side image formation plane.

16. A projection-type image display apparatus comprising:
the projection system according to claim 5; and
a display that displays a projection image in the demagnifying-side image formation plane.

17. A projection-type image display apparatus comprising:
the projection system according to claim 7; and
a display that displays a projection image in the demagnifying-side image formation plane.

18. A projection system comprising a first optical system and a second optical system sequentially arranged from a demagnifying side toward a magnifying side, the projection system forming a first intermediate image and a second intermediate image in positions between a demagnifying-side image formation plane and a magnifying-side image formation plane of the projection system,
wherein the second optical system is a lens,
the lens has a first transmissive surface, a reflective surface, and a second transmissive surface sequentially arranged from the demagnifying side toward the magnifying side,
three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z,
the first transmissive surface and the reflective surface are located at the lower side of an imaginary axis extending in the axis-Z direction,
the second transmissive surface is located at the upper side of the imaginary axis,
the reflective surface has a concave shape,
the second transmissive surface has a convex shape protruding toward the magnifying side,
an imaginary line that connects an upper intersection to a lower intersection inclines with respect to an imaginary vertical line perpendicular to the imaginary axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ,
the lens is asymmetrical about the imaginary axis,
the first intermediate image is located in the first optical system, and
the second intermediate image is located in the lens between the first transmissive surface and the reflective surface.

19. A projection system comprising a first optical system and a second optical system sequentially arranged from a demagnifying side toward a magnifying side, the projection system forming a first intermediate image and a second intermediate image in positions between a demagnifying-side image formation plane and a magnifying-side image formation plane of the projection system,
wherein the second optical system is a lens,
the lens has a first transmissive surface, a reflective surface, and a second transmissive surface sequentially arranged from the demagnifying side toward the magnifying side,
three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z, the first transmissive surface and the reflective surface are located at the lower side of an imaginary axis extending in the axis-Z direction, the second transmissive surface is located at the upper side of the imaginary axis, the reflective surface has a concave shape, the second transmissive surface has a convex shape protruding toward the magnifying side, an imaginary line that connects an upper intersection to a lower intersection inclines with respect to an imaginary vertical line perpendicular to the imaginary axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ, the first intermediate image is located in the first optical system, the second intermediate image is located in the lens between the first transmissive surface and the reflective surface, and a first length of the lens from the imaginary axis to an upper side end along the imaginary vertical line is shorter than a second length of the lens from the imaginary axis to a lower side end along the imaginary vertical line.

* * * * *